(12) United States Patent
Parker et al.

(10) Patent No.: US 10,095,043 B2
(45) Date of Patent: Oct. 9, 2018

(54) FOLDABLE STEREOSCOPIC VIEWING APPARATUS

(71) Applicants: Kevin P. Parker, Berkeley, CA (US); Wayne Kasom, Oakland, CA (US)

(72) Inventors: Kevin P. Parker, Berkeley, CA (US); Wayne Kasom, Oakland, CA (US)

(73) Assignee: Powis Parker, Inc., Berkeley, CA (US)

( * ) Notice: Subject to any disclaimer, the term of this patent is extended or adjusted under 35 U.S.C. 154(b) by 59 days.

(21) Appl. No.: 15/290,975

(22) Filed: Oct. 11, 2016

(65) Prior Publication Data

US 2018/0101019 A1    Apr. 12, 2018

(51) Int. Cl.
   *G02B 27/22*    (2018.01)
   *G02B 7/02*     (2006.01)

(52) U.S. Cl.
   CPC ......... *G02B 27/2257* (2013.01); *G02B 7/021* (2013.01)

(58) Field of Classification Search
   CPC ............ G02B 27/22; G02B 2027/0134; G02B 27/2221; G02B 2027/0178; G02B 27/2257; G02B 21/22; G02B 7/021
   USPC ......................... 359/474, 462, 466, 467, 477
   See application file for complete search history.

(56) References Cited

U.S. PATENT DOCUMENTS 5,557,457 A * 9/1996 Esperti ................... G02B 23/18
                                                     359/407

* cited by examiner

*Primary Examiner* — Jade R Chwasz
(74) *Attorney, Agent, or Firm* — Philip A. Girard

(57) ABSTRACT

A stereoscopic viewing apparatus for use with a SmartPhone including a pair of lenses and a viewer body preferably fabricated at low cost from a single paper sheet. The sheet is provided with a pair of fold lines which define first and second sheet segments separated by a lens mounting segment. The lens mounting segment defines a pair of left and right lens openings for receiving the respective lenses, with the mounting segment further defining features that secure the lenses in place in the lens openings. When in an operating mode, the first and second sheet segments function to position the lenses appropriately for viewing stereoscopic images on a SmartPhone screen, with the viewer being capable of being folded into a compact state for shipping or storage.

28 Claims, 19 Drawing Sheets

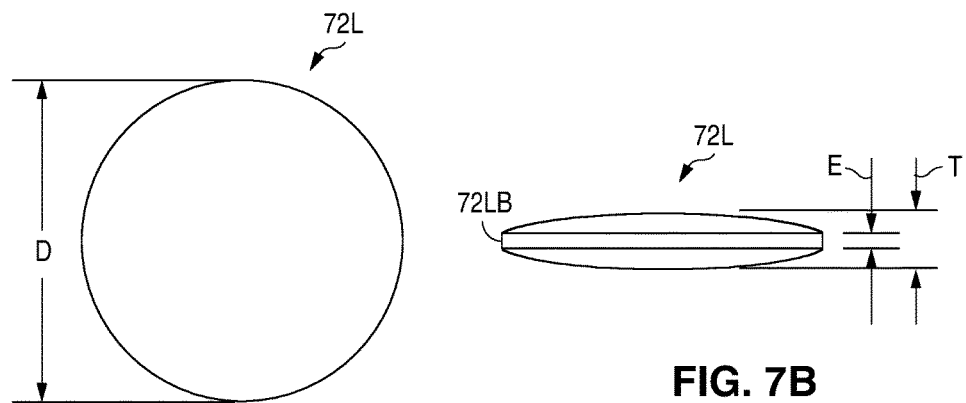
FIG. 7A
(PRIOR ART)
FIG. 7B
(PRIOR ART)
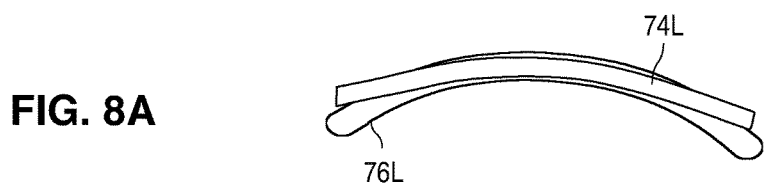
FIG. 8A
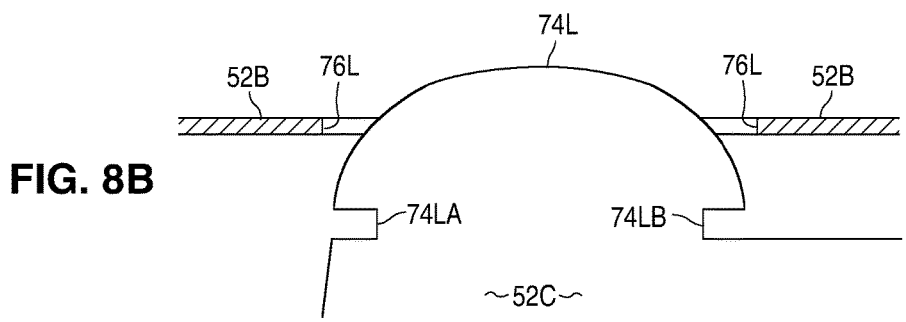
FIG. 8B
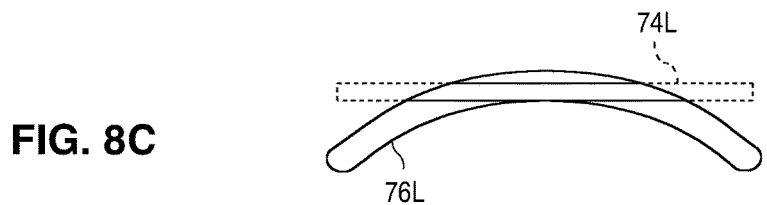
FIG. 8C

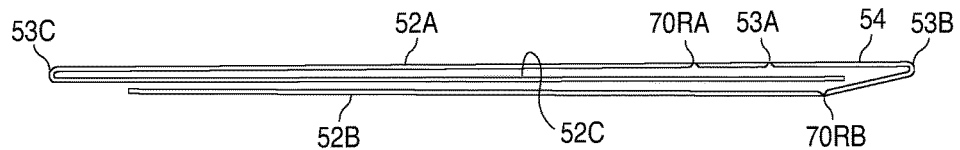
FIG. 12A
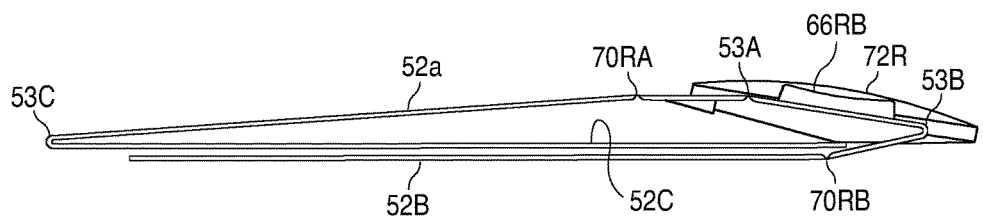
FIG. 12B
FIG. 13
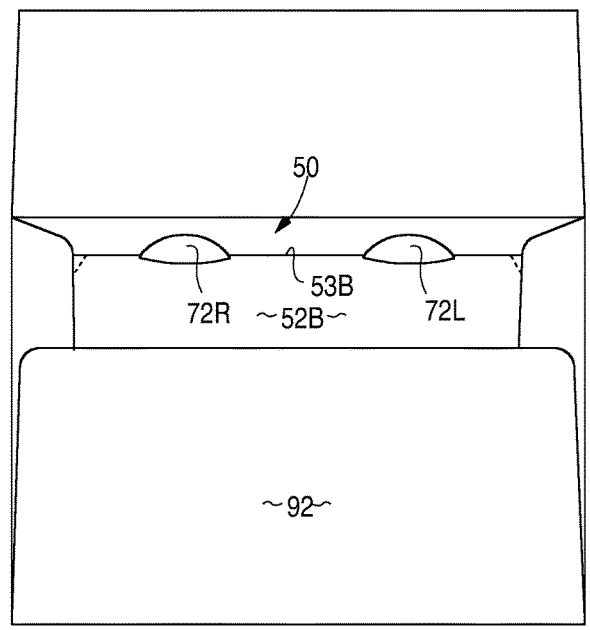

US 10,095,043 B2

FOLDABLE STEREOSCOPIC VIEWING APPARATUS

BACKGROUND OF THE INVENTION

1. Field of the Invention

The present invention relates generally to optical viewing devices and, in particular, to compact stereoscopic viewing devices for use with display apparatus such as cellular telephones of the type commonly referred to as SmartPhones.

2. Description of Related Art

Stereoscopic viewing apparatus are well known in the art. Referring now to the drawings, FIGS. 1 and 2 are two views a conventional handheld stereoscopic viewing apparatus, depicted generally by the numeral 20. As will be explained later in greater detail, apparatus 20 operates in conjunction with a suitably programmed conventional portable cellular telephone commonly referred to as a SmartPhone (sometimes generally referred to herein as a display apparatus). Viewing apparatus 20 and the SmartPhone operate together to provide a virtual reality ("VR") experience which is relatively advanced, particularly when considering the potential low cost of viewing apparatus 20 which can be used with most existing modern SmartPhones.

A large variety of software, primarily in the form of mobile apps, can be readily downloaded from the internet onto a user's SmartPhone to enable the phone to generate images that provide a Virtual Reality experience. One popular app is called Google Cardboard™ and is available on Apple's on line store at apple.com. FIG. 4 depicts an exemplary screen shot of a programmed SmartPhone display which includes a left (from a viewer's perspective) image region 46L and a right image region 46R. Also shown is image separation icon 46B and menu icon 46A. The two separate images 46L and 46R are of the same scene but are offset from one another. The viewing apparatus 20 functions to project the two images onto the respective left and right eyes of the viewer. As is well known, the two dimensional (2D) images are combined in the brain to produce the illusion of a single three dimensional (3D) image.

The majority of modern SmartPhones, such as those of the Apple iPhone® series include various internal sensors such as accelerometers, magnetometers and gyroscopes. These sensors can be used to detect rotational movement of the phone about all three axis. Further, the programmed image pairs, such as those of FIG. 4, are taken from all 360 degrees of the object. Thus, when the programmed phone is installed in the viewing apparatus 20 and the apparatus is positioned over the viewer's eyes, the phone sensors are able to detect rotational movement of the user's head and thereby control the generation of appropriate image pairs. In this manner, the user is able to observe the image object from any direction in 3D using natural head movements. Thus, the user is able to enjoy a VR experience.

Returning to the drawings, viewing apparatus 20 includes a housing 22 which, along with many other of the viewer components, can be fabricated from cardboard or other similar forms of semi-rigid paper. A front cut-out in the housing 22, with the outer edge preferably being covered in part by a soft cushion 40, is adapted to conform to a user's face. A pair of bi-convex lenses 44L and 44R are mounted on a lens support panel 42 secured within the housing. The lenses are preferably positioned near the user's eyes when the handheld viewing device is in operation. Lenses having a diameter of 33.4 mm and a focal length of 76 mm have been found suitable for this application. Lenses 44L and 44R, which are readily available from many sources at a relatively low cost, are positioned relative to a SmartPhone screen installed on the viewing device a distance about equal to 65 mm for this lens focal length. Thus, when so positioned the lenses provide a degree of image magnification and further place the virtual image of the screen near infinity so as to minimize eye strain. Lenses 44L and 44R may be individually set on panel 42 by way of screw mounts so that the position of each lens relative to the user's eyes can be individually adjusted to compensate for eyesight differences.

Viewing apparatus 20 preferably includes some mechanism for controlling operation of the SmartPhone while the viewing apparatus is positioned over the viewer's face. In the present example, the touch screen function of the SmartPhone is used as will be described. The interior of housing 22 includes a partition 34 (FIG. 2) disposed intermediate the lenses 44L and 44R. Partition 34 includes an extension in the form of an actuator arm 28. Arm 28 together with partition 34 are pivotally mounted within the housing so as to be movable between a retracted position as depicted in FIG. 2 and an actuating position (not depicted). When a user button 28A is depressed, a screen contactor 28B pivots forward to contact the SmartPhone screen. A spring (not depicted) operates to return the arm 28 and partition 34 to the retracted position after screen actuation is completed when the user releases button 28A. When in the retracted position, partition 34 and arm 28 limit light from the right image region 46R (FIG. 4) of SmartPhone reaching the user's left eye and limit light from the left image region 46L reaching the user's right eye so as to enhance the 3D effect.

Pivotable arm 28 is connected to actuator button 28A which extends through an opening in housing 22 to provide access to the button. An electrically conductive path is created from the user's finger by way of button 28A to display contactor 28B so that a conventional capacitive/conductive touch screen can detect the presence of contactor 28B when it is forced against the screen. Another common alternative approach to screen actuation can be used in the event the SmartPhone includes a magnetometer. A small movable magnet is mounted on housing 22 near the SmartPhone which can be manually toggled between two positions. This change in position can be detected by the SmartPhone magnetometer and used to control phone operation in much the same manner as display contactor 28B.

As can best be seen in FIGS. 2 and 3, housing 22 includes a back panel 24 which can be opened to receive a SmartPhone 30S (shown in phantom in FIG. 3) and closed to secure the SmartPhone in place. Back panel 24 is connected to the lower portion of the housing 22 by a back panel bottom segment 24B. A folding line 29B is formed in the back panel 24 by scoring the panel to facilitate folding. A top panel segment 24A is provided to hold the closed panel in place. Segment 24A is separated from back panel 24 by a fold line 29A created by scoring. One side 32A of a loop and hook fastener is secured at an appropriate location on the top of housing 22, with the mating side 32B of the fastener being secured to the top panel segment 24A. A foam layer 38 is sandwiched between the back panel 24 and a panel member 36, with the foam layer becoming compressed when a SmartPhone 30S is installed so as to apply a holding force against the back of the phone by way of panel member 36.

Although the prior art viewing apparatus 20 is capable of providing an enjoyable VR viewing experience, certain improvements could be made. In particular, viewing device 20 and similar devices tend to be bulky and thus not suitable for mailing in standard size business envelopes that are commonly entitled to reduced mailing rates such as #10 and A6 envelope. Thus, for example, mass mailings of the prior art viewing apparatus as part of a promotional advertising programs can be prohibitively expensive. In addition, manufacturing costs for such prior art apparatus are frequently relatively high so that their use in promotional programs may not be cost beneficial. There is a need for a viewing apparatus for use with SmartPhone and the like which provides a good VR viewing experience and yet can be shipped at low expense to the end user and can further be manufactured at low cost. The present invention successfully addresses these and other shortcomings of the prior art as will become apparent to those skilled in the art from a reading of the following Detailed Description of the Invention together with the drawings.

SUMMARY OF THE INVENTION

A foldable stereoscopic viewing apparatus for use with a SmartPhone is disclosed which includes a pair of lenses and a sheet, preferably made of paper. The sheet is provided with first and second spaced apart and parallel fold lines, with a lens mounting sheet segment being disposed intermediate the two fold lines, a first sheet segment disposed on another side of the first fold line and a second sheet segment disposed on another side of the second fold line. Left and right lens openings are formed in the lens mounting segment for receiving the respective lenses. A pair of lens cutouts are disposed on opposite sides of the left lens opening, with one of the cutouts extending from the first sheet segment over the first fold line to the left lens opening and with the other cutout extending from the second sheet segment over the second fold line to the left lens opening. A second pair of similar lens cutouts are associated with the right lens opening.

The left lens opening includes a pair of opposing edge contact members that can contact opposite edges of the lens and act as a lens positioning guide and a pair of opposing lens support tabs that can extend over the lens. When the sheet is in a planar state, the left lens can be positioned within the left lens opening, with the first and second sheet segments disposed on the inner side of the lens at opposite lens ends and with the pair of lens support tabs disposed over the outer side of the lens in a central region intermediate the opposite lens ends. In this manner the left lens can be secured in place. The right lens opening is provided with a similar structure so that the right lens can be secured in place.

When the viewing apparatus is in an operating state, the sheet is folded about the first and second fold lines which causes inner edges of the two lens cutouts of the left lens opening to contact the left lens thereby providing enhanced support for the left lens. Similarly, when in the operating state the inner edges of the two lens cutouts of the right lens opening to contact the right lens thereby providing enhanced support for the right lens. When in this operating state, the lenses are supported for viewing the SmartPhone screen. The apparatus can then be folded around at least one of the first and second fold lines to place the apparatus in compact storage state for storage and/or shipping.

BRIEF DESCRIPTION OF THE DRAWINGS

FIGS. 7A and 7B are respective top and edge views of a prior art biconvex lens suitable for use in the various embodiments of the present invention.

FIGS. 8A-8C relate to a tab and slot mechanism for connecting sheet segments together of various embodiment of the present invention when the viewing apparatus is switched to a folded operating state.

FIG. 12A is a side view of the viewing apparatus of FIG. 5 (no lenses) switched to the folded viewing state and FIG. 12B is side view of the viewing apparatus of FIG. 6 (lenses) switched to the folded viewing state.

FIG. 13 shows the FIG. 6 viewing apparatus in the folded storage state and installed in a shipping envelope.

DETAILED DESCRIPTION OF THE INVENTION

Figure 5:
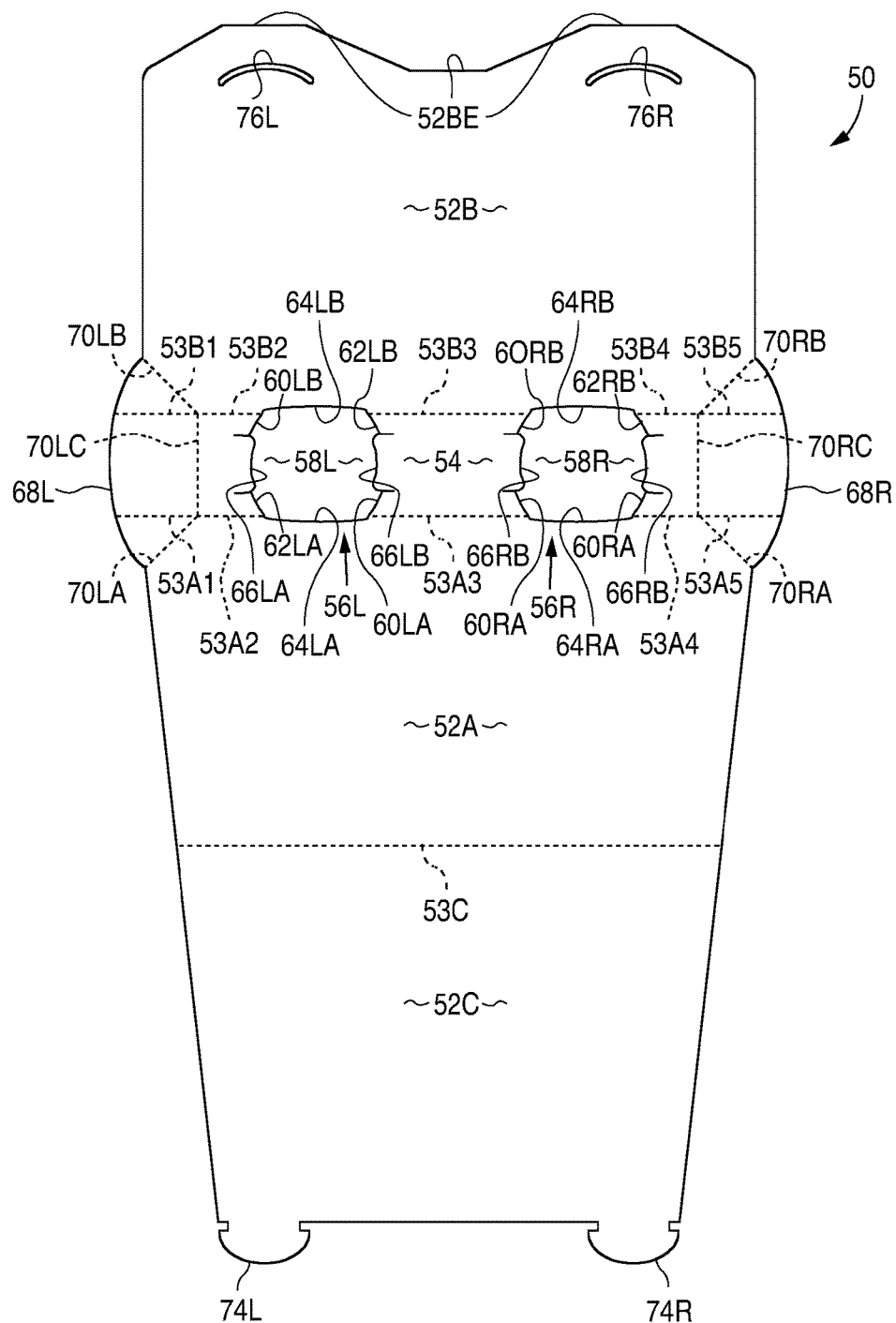
FIG. 5 is a plan view of one embodiment of the present invention switched to the planar state without the lenses installed.
Figure 6:
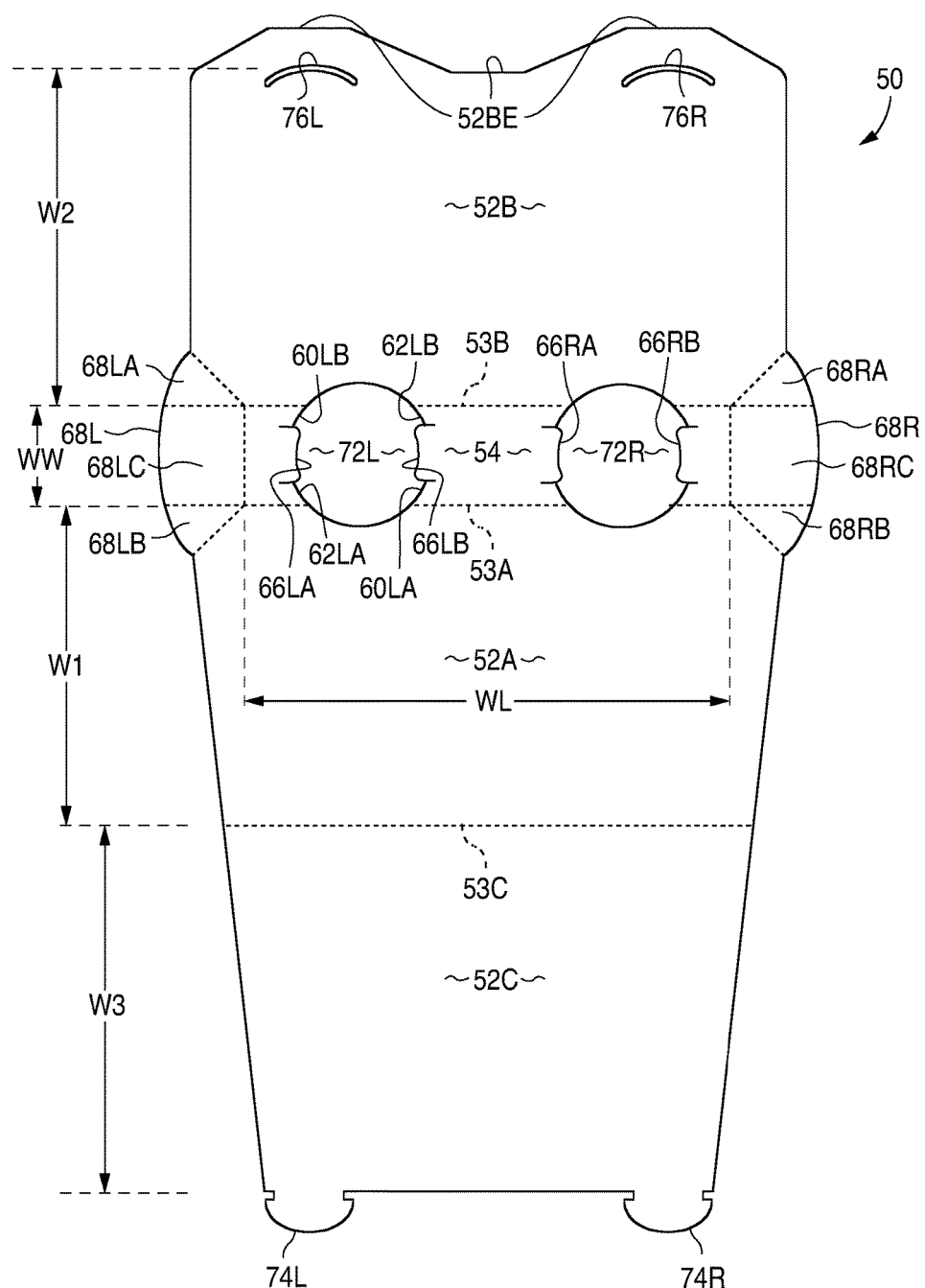
FIG. 6 is a plan view of the FIG. 5 embodiment switched to the planar state with the lenses installed.

Referring again to the drawings, FIGS. 5 and 6 depict one embodiment 50 of the subject viewing apparatus disposed in a non-operating planar state which is particularly suitable for shipping unfolded as an promotional insert to a magazine or the like. In addition to the planar state, the present embodiment viewing apparatus can be switched to a non-operating folded storage state and to a folded operating state as will be described later. As can be seen in FIG. 5. the viewing apparatus is preferably fabricated from a single paper sheet. A sheet made of 14 point tag stock paper has been found suitable for this purpose. The sheet is preferably cut to the appropriate size, and most other features formed, using a conventional die cutter. As will be described later, the sheet has a cosmetic or outer side, which typically has graphic images which can be viewed when the subject viewing apparatus is in the folded operating state. The cosmetic or outer side is facing the viewer in FIGS. 5 and 6.

The sheet is provided with various fold lines (or fold line sections) to be described which are preferably implemented by both score lines and perforations. As will be described, it has been found that a selected combination of these methods of creating the fold lines or fold line sections facilitates deploying the subject viewing apparatus from the folded storage state to an optimum folded operating state. The score lines are formed by using a conventional scoring machine which applies pressure using a thin tool along the length of the path of the fold line thereby causing the underlying paper to compress so as to create a thinned region which facilitates folding about the score line. Typically, little or no portion of the paper sheet surface is broken. As will be seen, mainly for purposes on convenience, all scoring is performed on the inner side of the sheet. Perforations are created by cutting slits along the fold line path which extend entirely through the sheet. Perforations in the form of slits about ⅛ inch long and spaced apart by about ⅛ inch have been found suitable for this purpose. For cosmetic reasons, the perforations are cut from the outer or cosmetic side of the sheet so that small amount of paper fiber forced out of the sheet during cutting is disposed on the non-cosmetic side.

As previously noted, the fold lines are implemented by a combination of score lines or perforations. Fold lines implemented by perforations are significantly less resistant to folding or unfolding as compared to lines implemented by score lines alone. In some instances all of the fold lines or fold line sections are implemented by score lines, where certain fold lines are also further implemented by the addition of perforations. In any case, a given section of fold lines implemented by perforations alone or by perforations in combination with score lines are both significantly less resistant folding/unfolding as compared to the fold line sections being implemented by scoring alone.

As can best be seen in FIG. 5, the single sheet of the first embodiment viewing apparatus 50 is divided into four segments by way of the three parallel fold lines. A lens mounting segment 54 is disposed intermediate first and second sheet segments 52A and 52B. Fold line 53A (FIG. 6), which is made up of fold line sections 53A1-53A5 (FIG. 5), separates the lens mounting segment 54 from the first sheet segment 52A. Fold line 53B (FIG. 6), made up of fold line sections 53B1-53B5 (FIG. 5), separates the lens mounting segment 54 from second sheet segment 52B. Fold line 53C separates the first sheet segment 52A from the third sheet segment 52C.

The lens mounting segment 54 operates to secure a pair of identical bi-convex lenses 72L and 72R. FIG. 6 shows the viewing apparatus 50 of FIG. 5 with the lenses 72L and 72B installed. FIGS. 7A and 7B show one of the lenses 72L. An acrylic (PMMA) lens having a focal length of 75 mm has be found suitable for this application. Lens 72L has an outer diameter D of 33.5 mm, a center thickness T of 5.1 mm and an edge thickness E of 1.3 mm. As can be seen in FIG. 6, the width WW of the lens mounting segment 54 is defined by the spacing between fold lines 53A and 53B. The fold line spacing WW in the present example is 24 mm which is considerably smaller than the lens diameter D of 33.5 mm. As will be explained, this arrangement provides for increased support for lenses 72L and 72R when the subject viewing apparatus is moved from the non-operating planar state to the folded operating state.

Referring back to FIG. 5, lens mounting segment 54 includes two identical lens mounting structures 56L and 56R cut from the sheet which are for mounting respective lenses 72L and 72R. Left lens mounting structure 56L is provided with an opening 58L formed in lens mounting segment 54. A first pair of opposing lens edge contacts 60LA and 60LB are disposed on opposite sides of opening 58L and are spaced apart from one another a distance slightly greater than or equal to the diameter D of the lens 72L (FIG. 7A). The opposing outer edges of contacts 60LA and 60LB are curved to match the curvature of the outer edge 72LA (FIG. 7B) of the lens. Similarly, a second pair 62LA and 62LB of opposing lens edge contacts are provided, which are positioned 90 degrees offset from the first pair and have the same shape and distal spacing D. The two pairs of lens edge contacts retain the lens in the desired position within the plane defined by the lens mounting segment 54. The curved edges of contacts 60LA and 62LA preferably terminate at fold line 53A and the curved edges of contacts 60LB and 62LB preferably terminate at fold line 53B.

Left lens mounting structure 56L further includes a pair of opposing extension tabs 66LA and 66LB which extend from the opposite edges of opening 58L towards the center of the opening. The paper extension tabs have some degree of memory so that if manually deflected from the original planar position, the tabs will tend to return to the original position (assuming that the deflection is not too great). The sides of the extension tabs are separated from the surrounding structure, including lens edge contacting pair 60LA and 60LB for example, by a relatively wide slit (not designated). The length of each extension tab 66LA and 66LB is such that the tabs can extend up over and past the edges of the lens so as to restrict movement of the lens in one direction normal to the plane of lens mounting segment 54. The distal ends of the extension tabs are somewhat rounded which, as has been found, make the presence of the tabs less noticeable to the viewer. The length of the extension tabs 66LA and 66LB are such that the tabs will not unduly interfere with light transmission through the lens. In addition, the extension tabs 66LA and 66LB will terminate on the convex surface of the lens a sufficient distance short of the thickest portion T (FIG. 7B) of the lens so that the thickness of the extension tabs does not add to the lens thickness. This is illustrated in FIG. 9B where it can be seen that the overall thickness of the lens 72L and surrounding structure is determined by the thickness of the lens itself and is not increased by the presence of extension tab 66LB. This feature tends to reduce the overall thickness of the viewing apparatus in the folded storage state in those instances where the lens is present in that state.

Figure 10A:
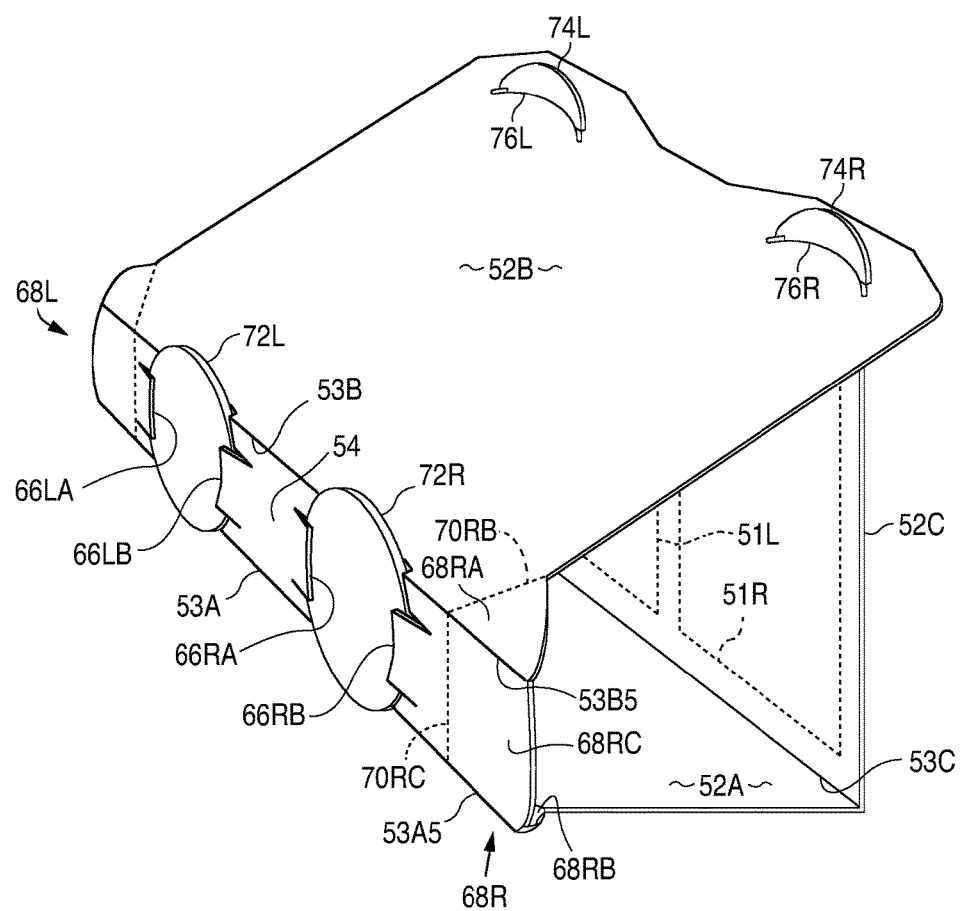
FIG. 10A shows the FIG. 6 viewing apparatus in the process of being switched to the folded viewing state and FIG. 10B shows the apparatus switched to the final viewing state.
Figure 10B:
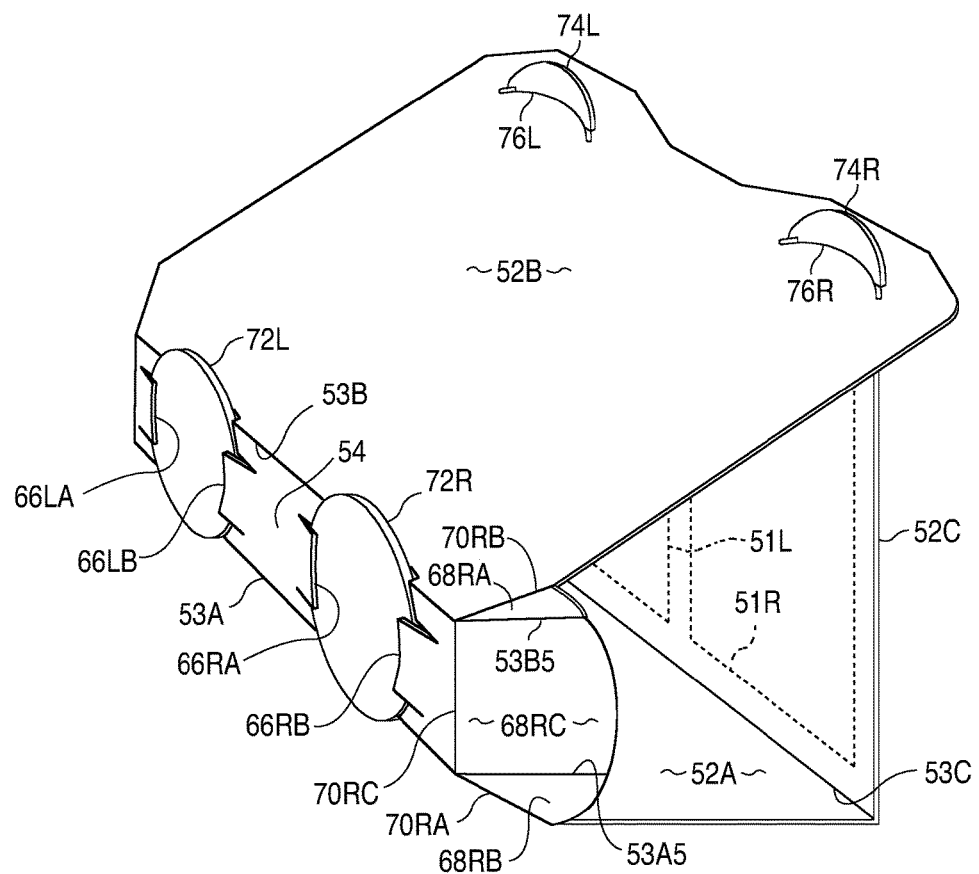

Continuing, as shown in FIG. 5, the left lens mounting structure 56L is further provided with a pair of opposing cutouts 64LA and 64LB which extend from opposite ends of the lens opening 58L. In the case of cutout 60LB, part of the cutout is disposed at sheet segment 52B (FIG. 5) and extends past fold lines 53B2 and 53B3 (sections of second fold line 53B) all the way to lens opening 58L. With respect to cutout 60LA, part of the cutout is disposed at first sheet segment 52A and extends past fold lines 53A2 and 53A3 (both sections of fold line 53A) over to lens opening 58L. Cutouts 64RA and 64RB of the right lens mounting structure 56R are similarly situated with respect to the first sheet segment 52A and 52B and the fold lines. The inner edges of cutouts 60LA and 60LB facing opening 58L and the inner edges of cutouts 64LA and 64LB facing opening 58R are curved so as to conform to the surfaces of the respective lenses of lenses 72L and 72R when the first and second sheet segments 52A and 52B are folded with respect to the lens mounting segment 54 when the subject viewing apparatus is moved to the folded operating state. As will be described later in greater detail, FIG. 10B shows the first embodiment viewing apparatus in the folded operating state where it can be seen the first sheet segment 52A is folded with respect to the lens mounting segment 54 about fold line 53A and the second sheet segment 52B is folded with respect to the lens mounting segment 54 about fold line 53B.

Installation of the lenses 72L and 72R by the end user is straightforward. Referring to FIG. 5 where the apparatus is in the planar state, the user positions lens 72L on the surface of the first sheet segment 52B adjacent the left lens opening 58L. The lens is then slid under the two extension tabs 66LA and 66LB towards the first sheet segment 52A. Continuing, the lens edge is moved over first sheet segment 52A until the lens is centered over the lens opening 58L with the lens edges contacting the four lens edge contacts 60LB, 60LA, 62LA and 62LB. In this manner, the lens is supported on one side by opposing portions of the first and second sheet segments 52A and 52B and on the other side by the extension tabs 66LA and 66LB. As will be explained, the forces securing lens 72L in place are enhanced when the first and second sheet segments 52A and 52B are folded around respective fold lines 53B and 53A when the apparatus is switched to the folded operating state. Lens 72R is installed in lens opening 58R in a similar manner.

Figure 9A:
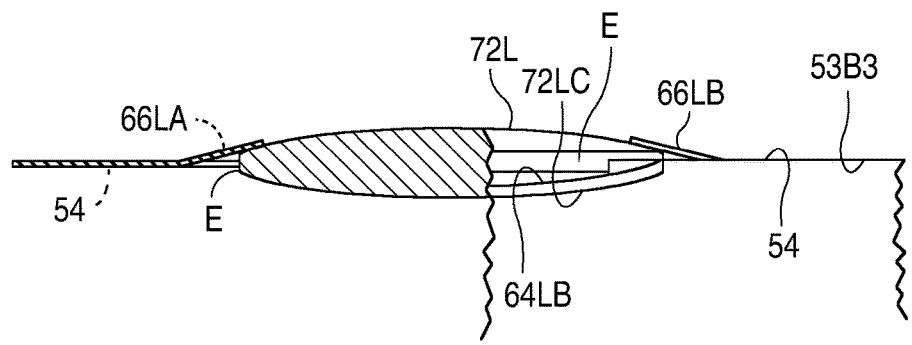
FIGS. 9A and 9B are edge views of one lens and surrounding structure of the FIG. 6 viewing apparatus when the apparatus is switched to the folded viewing state.
Figure 9B:
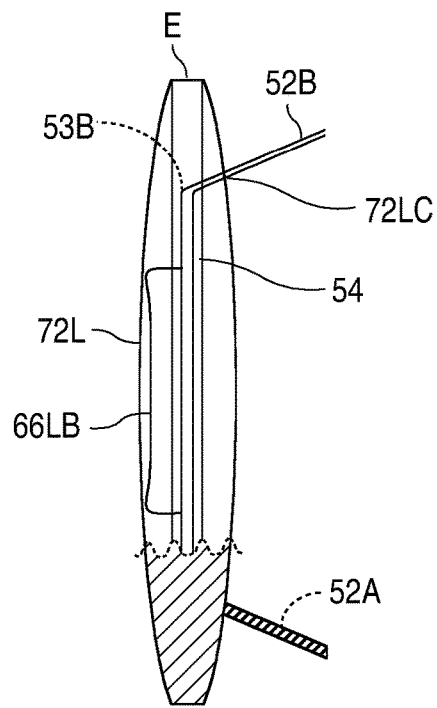

FIGS. 9A and 9B show lens 72L and a portion of the surrounding lens mounting structure when the subject viewing apparatus is in the folded operating state as noted above in connection with FIG. 10A. As shown in FIG. 9B, a portion of the left lens mounting structure is shown with lens 72L in place. The second sheet segment 52B is shown folded with respect to the lens mounting segment 54 about fold line 53B, with only section 53B3 of fold line 53B being depicted. As can be seen in FIGS. 9A and 9B, the curved portion of cutout 64LB is pressed against the curved surface of lens 72L in region 72LC of the lens thereby applying an increased securing force to the lens against the two extension tabs 66LB and 66LA. The second cutout 64LA will also apply an additional force to lens 72L when sheet segment 52A is folded with respect to the lens mounting segment 54 around fold line 53A. One contributing factor to this beneficial arrangement is the fact that width WW is less than the diameter D of the lenses.

When the subject viewing apparatus is deployed to the folded operating state about fold lines 53A, 53B and 53C, the end portions of sheet segments 52B and 52C are temporarily secured together. This is carried out by way of a pair of connecting tab members 74L and 74R which are inserted in pair of respective curved connecting slots 76L and 76R (FIG. 5 and FIG. 10B). Some of the details of the left connecting tab member 74L and the left connecting slot 76L are shown in FIGS. 8A, 8B and 8C. Each of the connecting tab members, including member 74L of FIG. 8B is provided with a rounded leading edge and a pair of cuts 74LA and 74LB at the base of the connecting tab member where the tab member terminates in the third sheet segment 52C. Cuts 74LA and 74LB are slightly wider that the thickness of the second sheet segment 52B. The curved length of connecting slots 76L is slightly greater than the width of the corresponding connecting tab member 74L. Thus, as shown in FIG. 8A, when the rounded leading edge of the flat tab member 74L is first inserted in slot 76L, the curvature of the slot will cause the rounded leading edge to bend so that the normally flat leading edge will conform to and enter the curved slot. As the tab member 74L is pushed further into the slot, the tab member will continue to bend as it passes through the slot until the edge of the third sheet segment 52C supporting the tab member engages the edge of the second sheet segment 52B. At that point the pair of opposing cuts 74LA and 74LB formed in the tab member are aligned with the edges of second sheet segment 52B so that the connecting tab member 74L will be free to return to the normal flat shape as depicted in phantom in FIG. 8C. At this point the flat tab member 74L is locked in place and cannot be withdrawn from the curved slot 76L.

In order to withdraw the flat connecting tab member 74L, it is necessary to manually bend the tab member, typically by pinching outer edges of the flat tab member together, to cause the tab member to have a curved shape that conforms to the curved shape of slot 76L as shown in FIG. 8A. At that point, tab member 74L can then be fully withdrawn from the slot. The same sequence can then be carried out with tab member 74R and slot 76R thereby freeing the second sheet segment 52B from the third sheet segment 52C.

Figure 11A:
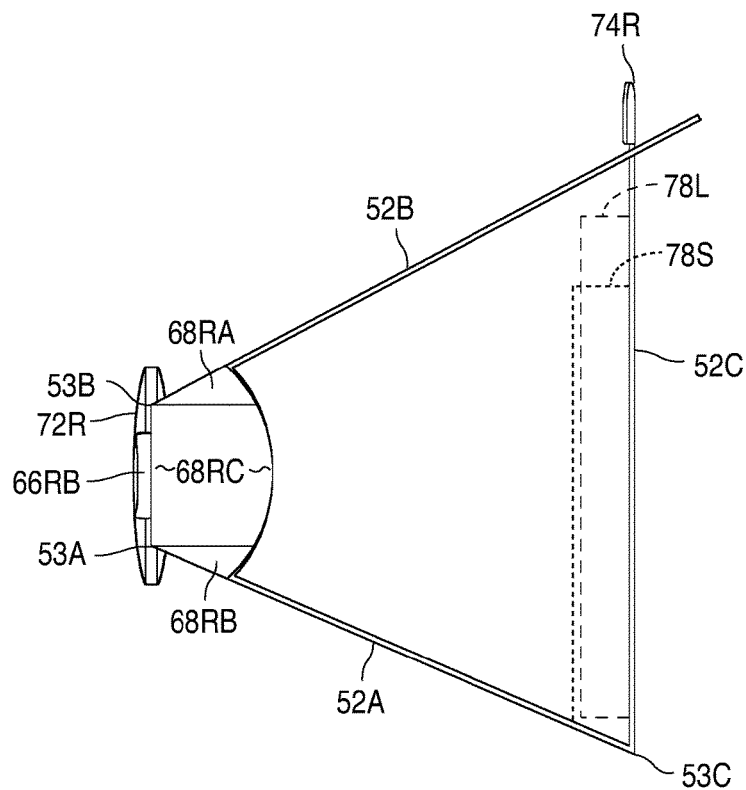
FIG. 11A is cross-sectional side view of the FIG. 10B viewing apparatus in the final viewing state and FIG. 11B is a schematic view of the FIG. 11A apparatus for illustrating the geometry of the FIG. 11A apparatus.
Figure 11B:
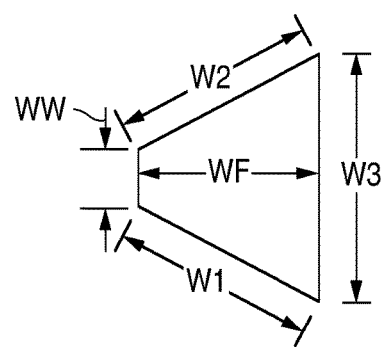

As will be explained, when the present embodiment viewing apparatus is deployed to the folded operating state as depicted in FIG. 11A, the lens mounting segment 54 (not designated in FIG. 11A) should be generally parallel to the third sheet segment 52C. The phrase "generally parallel" in the present case means parallel to within ±15 degrees, Since the SmartPhone 78S/L, shown in phantom, is resting against the third sheet segment 52C, the screen surfaces will also be generally parallel with the third sheet segment. In order to achieve this result, while providing an overall form factor suitable for a compact hand held viewing apparatus, the lens mounting segment 54, and the three sheet segments 53A, 53B and 53C are dimensioned and arranged to closely form what is commonly referred to as a convex isosceles trapezoid when the apparatus is in the folded viewing state. FIG. 11B is a schematic drawing of the trapezoid formed by the device of FIG. 11A. The two parallel trapezoid bases have lengths WW and W3 and are further designated in FIG. 6. As can be seen, WW is set by the spacing between fold lines 53A and 53B which define the width of the lens mounting segment 54 and which, in the present exemplary embodiment, is 24 mm. Length W3 is determined by the third sheet segment 52C (FIG. 6) construction and is equal to the distance between fold line 53C and the base of the connecting tab members 74L/74R. W3 is 87 mm in the present exemplary embodiment. Length W1 is determined by first sheet segment 52A and is equal to the spacing between fold lines 53A and 53C. Length W2 is determined by the second sheet segment 52B construction and is equal to the spacing between fold line 53B and connecting slots 76L/R. As is the case of an isosceles trapezoid, both lengths W1 and W2 are equal at 80 mm. In addition, in the present exemplary embodiment, the length WL (FIG. 6) between the tab member fold lines 70LC and 70RC (FIG. 5) is 118 mm.

Assuming that the angle formed by the lens mounting segment 54 (WW) and the first sheet segment 52A (W1) is about equal to the angle between the lens mounting segment 54 (WW) and the second sheet mounting segment 52B (W2), as would be the case for an isosceles trapezoid, distance WF from the lens mounting segment 54 and the third sheet segment 52C is dictated by simple geometry to be 73.7 mm. Since the user's SmartPhone 78S/L (FIG. 11A) rests against the interior of sheet segment 52C in the folded operating state, the spacing between the lenses 72L/R and the from screen of the phone, taking into account typical phone thickness, has found to be optimum for the previously noted focal length of the lenses of 75 mm. Note also that relatively small phone 78S (FIG. 11A) and relatively large phone 78L, when resting on a common base (defined by sheet segment 52A) will have screen centers that are offset from one another due to the difference in screen sizes. Among other things, the above-described dimensions are selected so that the principle axes of lenses 72L and 72R will intersect the phone screens at a point about half way between the two screen centers as a compromise.

The selection of lengths WW, W1, W2 and W3 does not, alone, ensure that the desired isosceles trapezoid arrangement is achieved where, among other things, the lens mounting segment 54 is generally parallel to the third sheet segment 52C. In other words, unlike a triangle, the present structure based upon lengths alone is not inherently rigid. However, if steps are taken to ensure that the angle between the lens mounting segment 54 and the first sheet segment 52A is made equal to the angle between the lens mounting segment 54 and the second sheet segment 52B, which is about 113 degrees in this example, a true isosceles trapezoid is formed and the goal of making the lens mounting segment 54 and the third sheet segment 52C generally parallel will be achieved.

In order to urge the two angles between the lens mounting segment 54 and the second and third sheet segments 52A and 52B to be equalized, a pair of tab members 68L and 68R, shown in a planar state in FIGS. 5 and 6, are provided. As can be seen, tab members 68L and 68R both include sections that form part of the second and third sheet segments 52A and 52B. As will be explained, the tab members are deployed when the subject viewing apparatus is switched to the folded viewing state at which point the tab members apply a relatively small expansion force between the first and second sheet segments 52A and 52B in the regions near lens mounting segment 54.

Referring again to FIGS. 5 and 6, left tab member 68L includes fold line sections 70LA, 70LB, 70LC, 53A1 and 53B1 and right tab member 68R includes fold line sections 70RA, 70RB, 70RC, 53A5 and 53B5. These fold line sections define both the left tab member panels 68LA, 68LB and 68LC and the right tab member panels 68RA, 68RB and 68RC. Fold line sections 53A1 and 53A5 form part of the first fold line 53A and fold line sections 53B1 and 53B5 form part of the second fold line 53B. Note also the fold lines 70LC and 70RC are both normal to fold lines 53A, 53B and 53C. FIG. 10A shows the subject viewing apparatus at one point in the sequence of moving the apparatus to the folded operating state, where the second sheet segment 52B is secured to third sheet segment 52C by way of the connecting tab members 74L and 74R and slots 76L/R. Tab members 68L and 68R are not yet deployed to an operating state. FIG. 106 shows the viewing apparatus of FIG. 10A in the final folded operating state with tab members 68L and 68R deployed, with each of the tab members both being deployed in the same manner.

With respect to tab member 68R shown in FIG. 10A, the member is set to the operating state by manually pressing tab panel 68RC so that the panel will rotate inward around fold line 70RC. As panel 68RC rotates, side panels 68RA and 68RB are pulled inward as they rotate around respective fold lines 70RB and 70RA. It can be seen that the total linear length of panels 68RB, 68RA and 68RC when in the planar state shown in FIG. 6, is greater than the spacing between the first and second sheet segments 52A and 52B near the lens mounting segment 54. This is due, among other things, to the presence of panels 68RA and 68RB. Thus, in order for panels 68RB, 68RA and 68RC to rotate to a position intermediate the first and second sheet segments 52A and 52B, the total effective length of the panels must be reduced by flexing about fold lines 53A5 and 53B5. Further application of force will cause panel 68RC to pass through an over-center state. At this point the folded tab panels 68RC, 68RA and 68RB will be allowed to naturally fold inward thereby locking the tab member 68R in the deployed state. Force applied to panel 68RC in the opposite direction is required to cause the tab member 68R to return to the non-deployed state of FIG. 10A. Tab member 68L operates in a similar manner. In practice it is possible for user to deploy both tab members 68L and 68R at the same time using the left and right hand. Similarly, the tab members can be non-deployed at the same time when the viewing apparatus is returned to the folded storage state.

Referring to FIG. 10B, when tab member 68R is in the deployed state, panel members 68RA, 68RB and 68RC are compressed between the first sheet segment 52A and second sheet segment 52B so as to apply an expansion force to the sheet segments. The expansion force is applied to the first sheet segment 52A along fold line 70RA starting at fold line 53A and ending at the edge of the first sheet segment. The same expansion force is applied to the second sheet segment 53B along fold line 70RB starting at fold line 53B and ending at the edge of the second sheet segment. Tab member 68L applies a similar expansion force to the first and second sheet segments 52A and 52B in the same manner. This is a symmetrical arrangement where the same expansion forces are applied to the two sheet segments 52A and 52B at the same respective locations. This would normally result in the same rotation of the two sheet segments 52A and 52B about the respective folding lines 53A and 53B so that a desired isosceles trapezoid arrangement results. However, this will not necessarily be the case since the two sheet segments will exhibit different resistances to rotation. As will be described later, when the subject viewing apparatus is in the folded storage state as shown in FIG. 12B, no folding occurs at fold line 53A and an almost 180 degree fold is present along fold line 53B. Thus, less resistance is required to rotate along fold line 53B as compared to fold line 53A. Similarly, fold line 53C and the folding axis which results by the tab 74 and slot 76 connection between the second and third sheet segments 52B and 52C may exhibit differing rotating resistance.

One preferred approach to addressing these differing rotational resistances relates to the manner in which the various fold line sections are implemented. As previously noted, fold lines (or fold line sections) can be implemented by scoring alone or by perforations (either alone or in combination with scoring). In the present embodiment, primarily for the purpose of simplicity of manufacture, those selected fold line sections to be implemented by perforations are also scored, with the combination having folding properties similar to that of perforations alone. In order to reduce the rotational resistance around fold line 53A (which is not folded in the folded storage state and is thus resistant to folding) to more closely match that of fold line 53B (which is folded close to 180 degrees in the folded storage state), fold line 53A is primarily implemented using perforations (alone or in combination with score lines) and fold line 53B is primarily implemented using score lines. Referring to FIG. 5, most of fold line 53B (sections 53B2, 53B3 and 53B4) is formed using score lines alone as is fold line 53C. Perforations, alone or in combination with scoring, are used to form fold line 53A (sections 53A1, 53A2, 53A3, 53A4 and 53A5) along with sections 53B1 and 53B5 of fold line 53B. In addition, fold lines 70LC and 70RC are formed with score lines alone. Also, in order to facilitate easy deployment of tabs members 68L and 68R, the use of perforations is employed. Most of the fold lines associated with right tab member 68R, including 70RA and 70RB are implemented by way of perforations (alone or in combination with scoring). Most of the fold lines associated with left tab member 68L, including 70LA and 70LB are implemented by way of perforations (alone or in combination with scoring). The particular above-described selection between perforations and score lines are exemplary only and will vary depending upon many variables. However, given a particular implementation of the subject viewing apparatus, a person of even less than ordinary skill in the art would be capable of implementing the two fold lines 53A and 53B as either score lines or perforations (alone or in combination with scoring) in order to achieve the overall goal of causing the lens mounting segment 54 and the third sheet segment 52C to be sufficiently parallel when deployed so as to provide a satisfactory viewing experience in a low cost viewing apparatus. Assuming that a reasonable amount of quality control is maintained in the fabrication of the sheet, in the die cutting, and in the scoring and perforations, it has been found that satisfactory results are reproducible without the need of altering the original selection of score lines or perforations.

As previously noted, the present embodiment of the subject viewing apparatus is capable of being switched among a planar state as shown in FIGS. 5 and 6, a folded storage state as depicted, for example in FIGS. 12A and 12B, and a folded operating state as depicted, for example, in FIG. 10B. The lenses 72L and 72R may, or may not be installed in the folded storage state. FIG. 12B shows the present embodiment in a folded storage state with the lenses installed. With the lenses installed, the overall form factor of the folded viewing apparatus is slightly thicker than in the case of FIG. 12A where the lenses are not installed. Nevertheless, this option may be preferred depending upon the circumstances such as applicable postage rates and other various postal regulations which may apply. FIG. 13 illustrates the FIG. 12B arrangement inserted into a shipping envelope 92 before the envelope is sealed. In the present example envelope 92 is a standard "A6" style envelope measuring 4¾ by 6½ inches.

Figure 14:
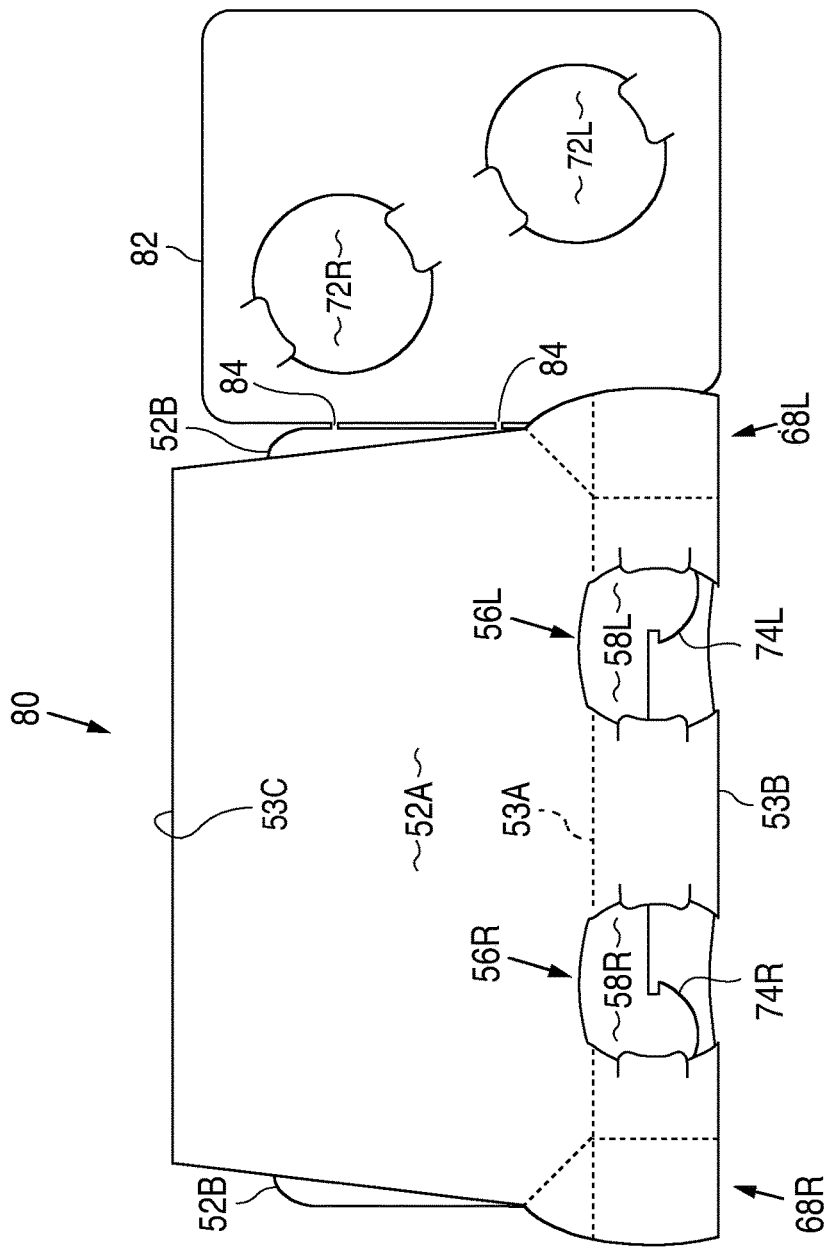
FIG. 14 is an alternative embodiment viewing apparatus of the present invention in the folded storage state which includes lens caddy for securing the lenses during shipping.

FIG. 12A shows the present embodiment viewing apparatus in the folded storage state without the lenses 72L and 72R installed. Depending on the circumstances including applicable postal regulations, it may preferable to ship the apparatus without the lenses installed since, among other things, the thickness of the form factor is reduced. In that case, the lenses must be provided to the end user by other means, preferably in the same shipping envelope. FIG. 14 depicts a modification to the previously-described first embodiment viewing apparatus 50. This second embodiment apparatus, generally designated by the numeral 80, includes the basic structure of the first embodiment of FIG. 5 with the lenses 72L and 72R not installed. The basic structure is modified to include a lens caddy 82 to allow shipping of the lenses 72L and 72R in the same envelope in which the basic structure is shipped. Lens caddy 82 is preferably made from the same paper sheet as the first embodiment of FIG. 5. Caddy 82 is provided with a pair of lens mounting structures (not designated) similar to structures 56L and 56R of the FIG. 5 embodiment but without the presence of folding lines such as folding lines 53A and 53B. As can be seen, the two lens mounting structures of the lens caddy 82 secures the lens pair 72R and 72L in place. The lens caddy 82 is attached to the second sheet segment 52B of the basic viewing structure by a pair of spaced-apart narrow attaching sections 84 so that the lenses will be positioned in an selected position adjacent the basic viewing structure during shipping. Preferably the lens caddy 82 is formed at the same time as the basic structure of FIG. 5 from a common paper sheet using a die cutter.

Figure 15:
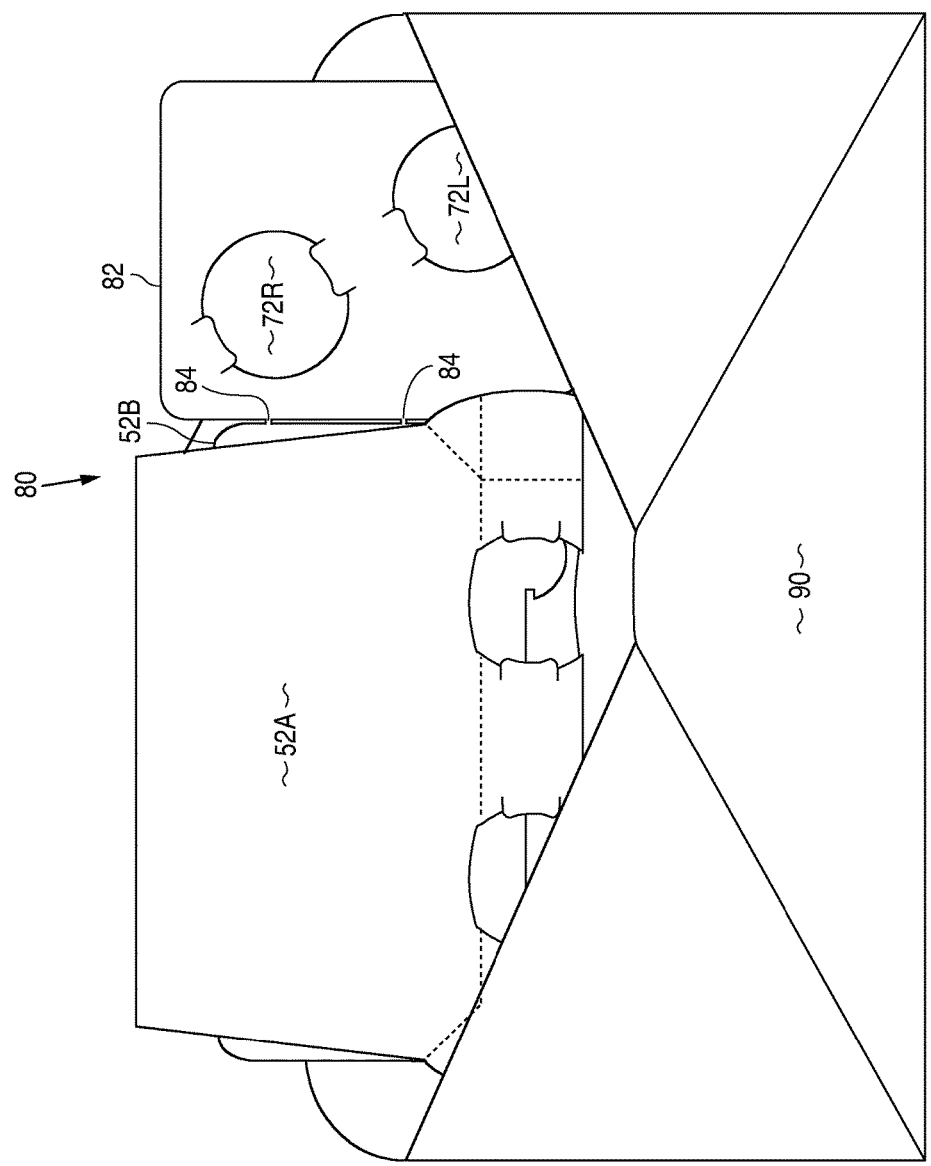
FIG. 15 shows the FIG. 14 embodiment viewing apparatus partially installed in a shipping envelope.

FIG. 15 shows the folded second embodiment viewing apparatus 80 of FIG. 14 partially installed in a mailing envelope 90. In the present example, envelope 90 is a standard "#10" style envelope measuring 4⅛ by 9½ inches. As can be seen, the lens caddy 82 positions the lenses in a fixed position within the envelope adjacent to the folded viewing apparatus so that lenses do not add to the thickness of the overall structure. Upon receipt, the end user can remove apparatus 80 from the envelope, separate the lens caddy 82 from the remaining structure by tearing the narrow paper attaching sections 84. The resultant structure is now the same as the first embodiment 50 of FIG. 5. The lenses can then be removed from the caddy and the caddy discarded. The lenses can then be installed in the viewing apparatus and the apparatus then converted to the folded viewing state when desired.

Figure 1:
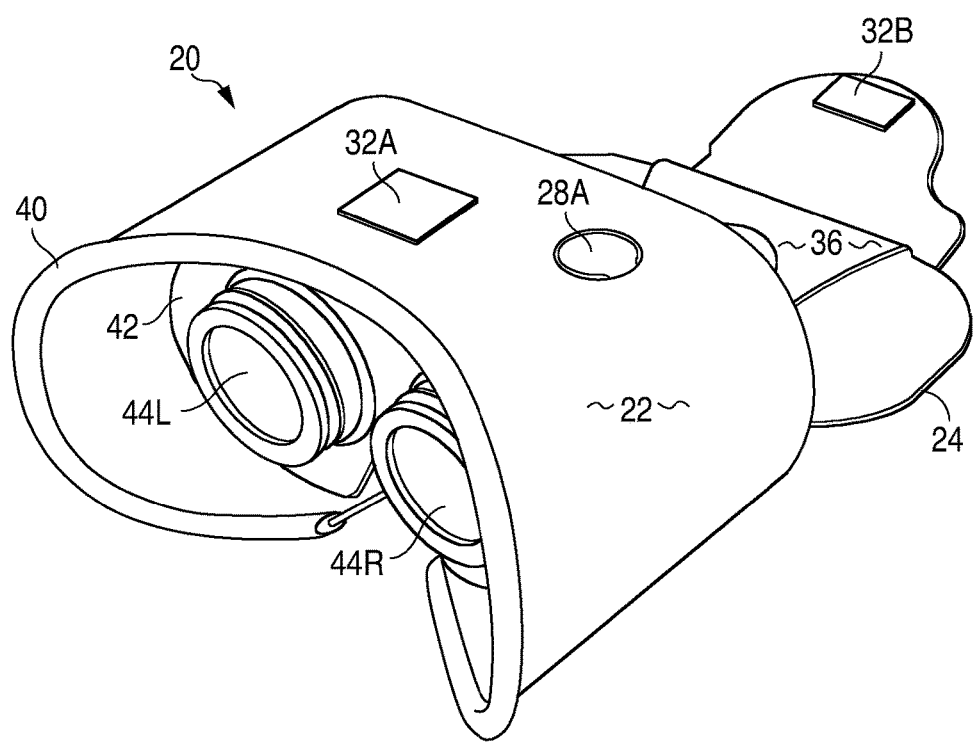
FIG. 1 is front perspective view of a prior art stereoscopic viewing apparatus.
Figure 2:
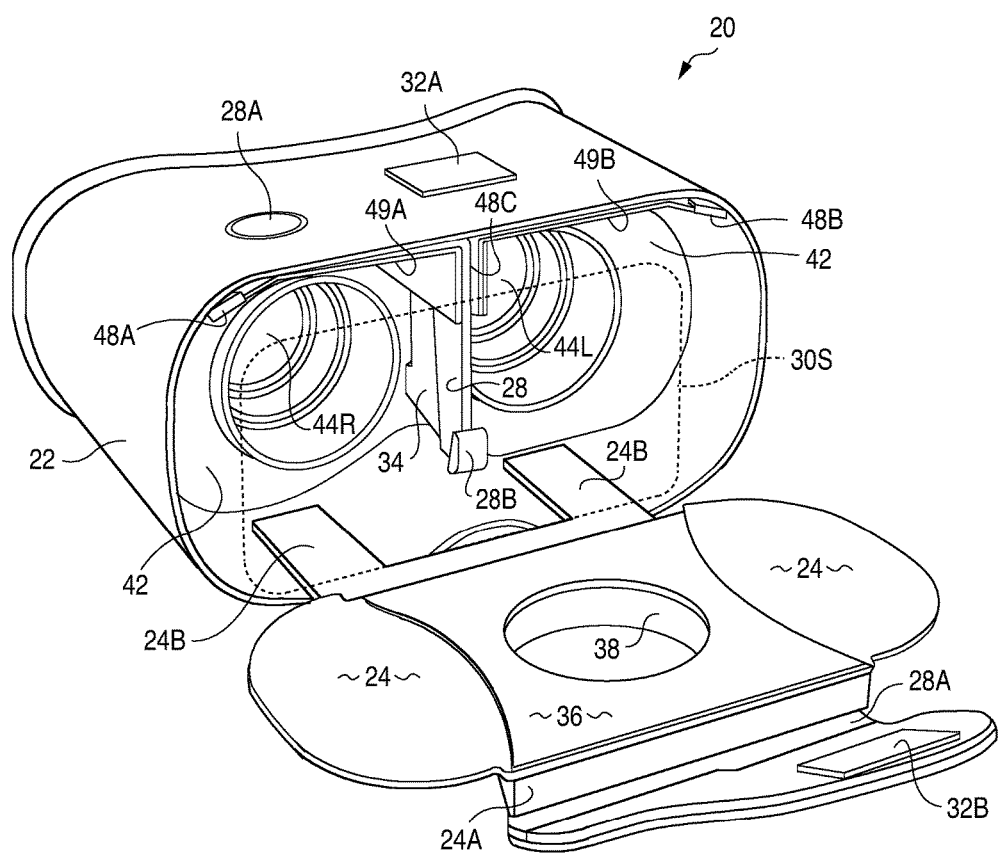
FIG. 2 is a rear perspective view of the prior art stereoscopic viewing apparatus of FIG. 1 with a hinged rear cover open for receiving a SmartPhone.
Figure 3:
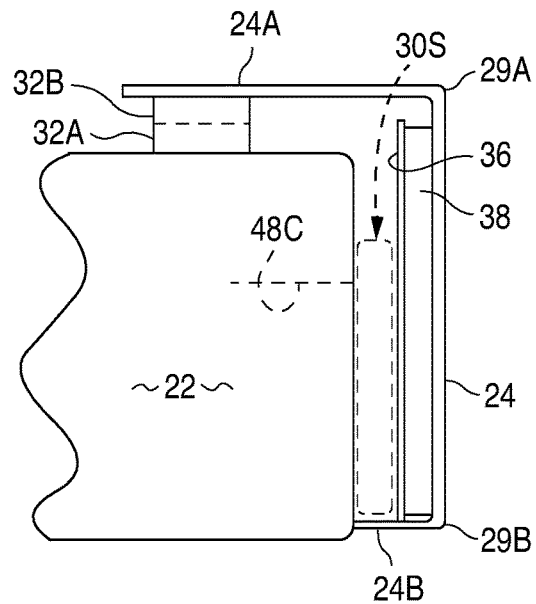
FIG. 3 is a side sectional view showing a SmartPhone in phantom installed in the prior art viewing apparatus of FIG. 1.
Figure 16A:
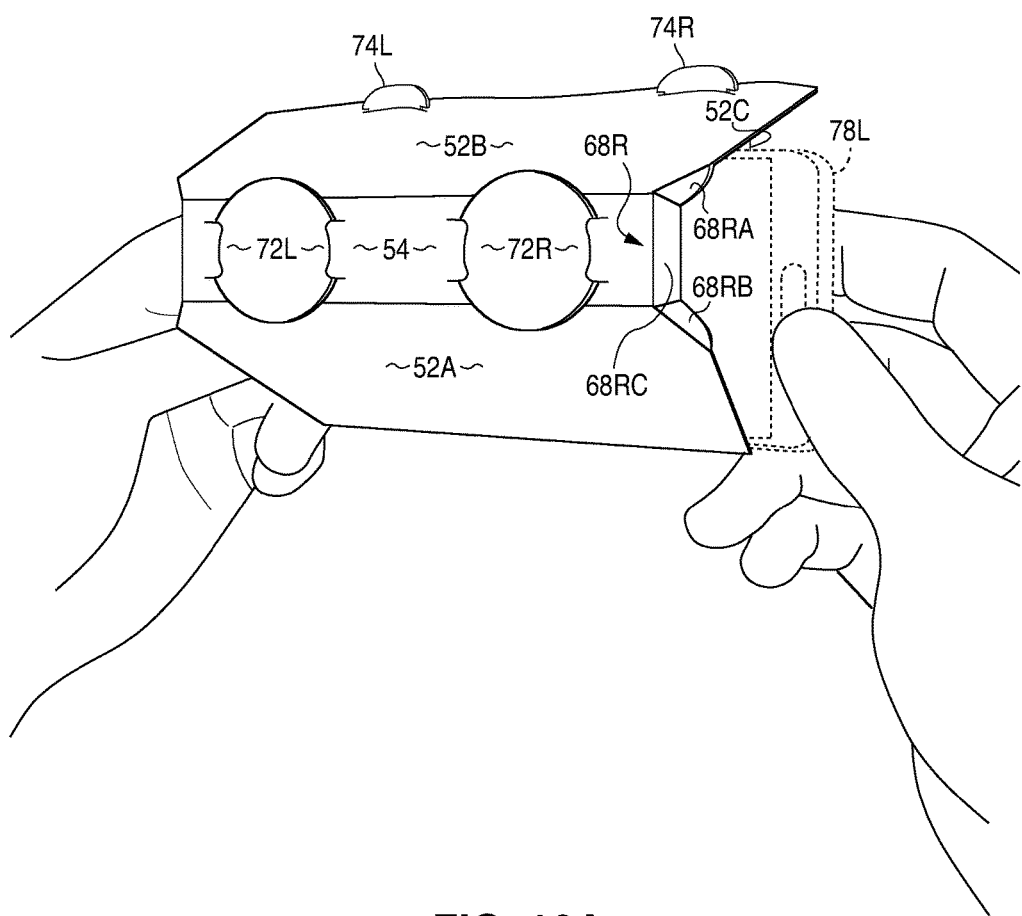
FIGS. 16A and 16B are respective front and rear perspective views of the FIG. 6 viewing apparatus showing the apparatus and an installed SmartPhone being held by a user for viewing.
Figure 16B:
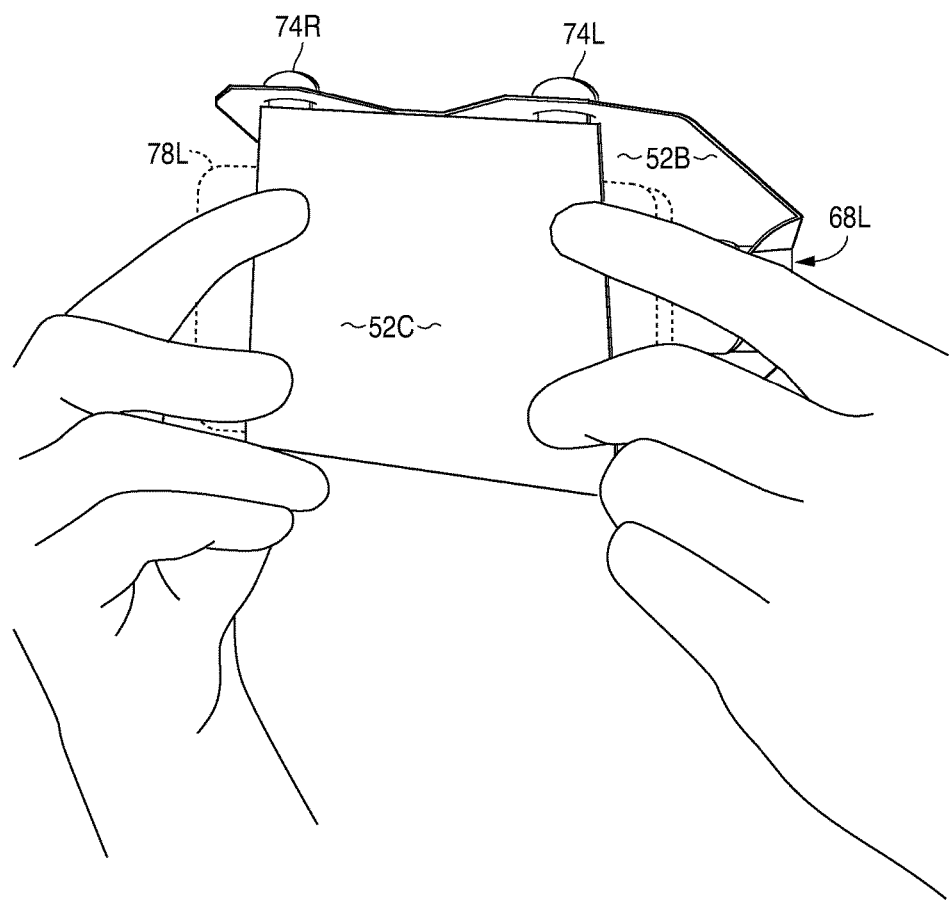

When the viewing apparatus is in the folded viewing state as depicted in FIGS. 16A and 16B, a SmartPhone 78L can be positioned within the apparatus adjacent the third sheet segment 52C and is resting within the fold created by sheet segments 52C and 52A as also shown in FIG. 11A. A user grips the SmartPhone and the third sheet segment 52C together as shown in FIGS. 16A and 16B so that the SmartPhone and the viewing apparatus are both secured in position for viewing. Since the user has easy access to the SmartPhone controls, a special dedicated control button, such as button 28A of the FIG. 1 prior art viewer is not required. Note also that the deployed tab members 68L and 68R function, to some extent, to block entry of light into the region intermediate the SmartPhone and lenses 72R and 72L to improve the viewing experience.

Figure 17A:
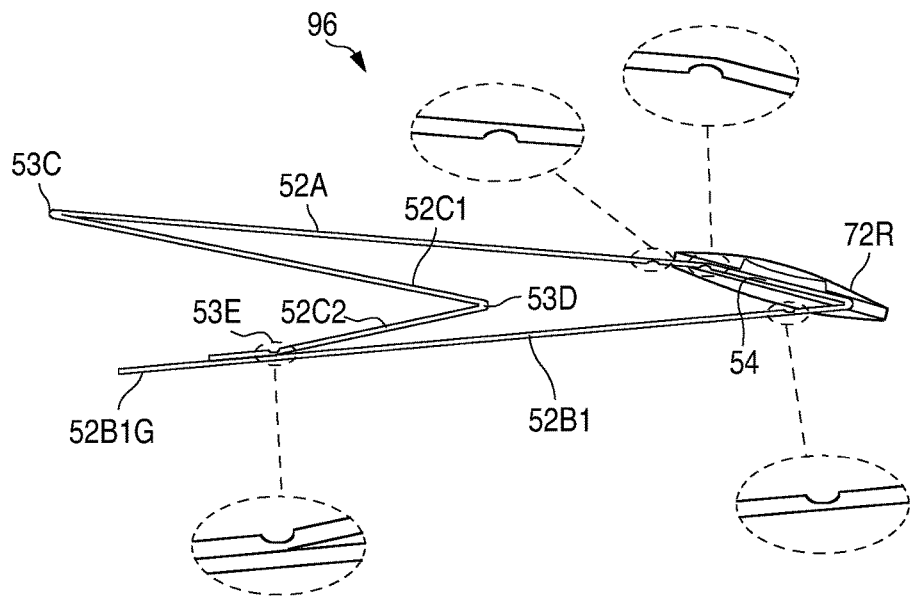
FIGS. 17A and 17B are respective side views of a further embodiment viewing apparatus in the folded storage state with lenses installed and not installed.
Figure 17B:
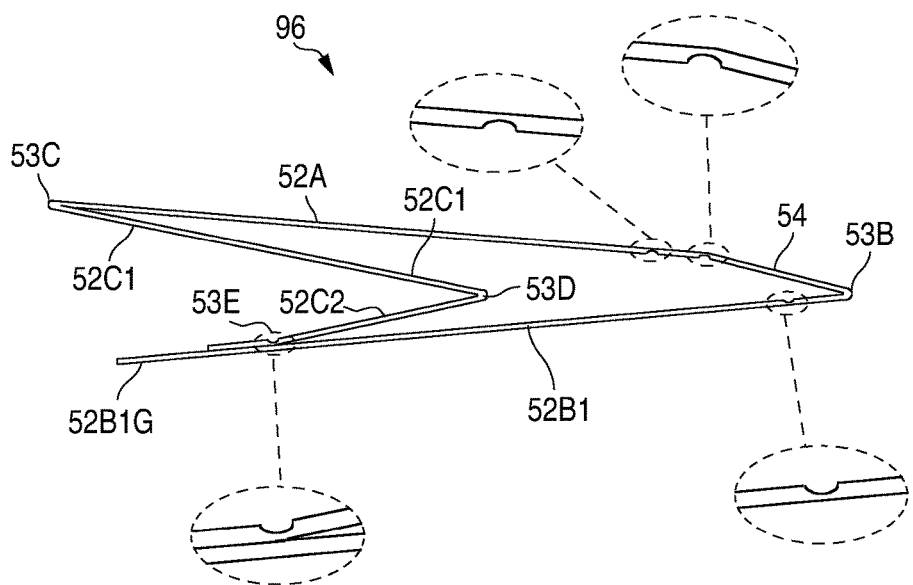
Figure 18:
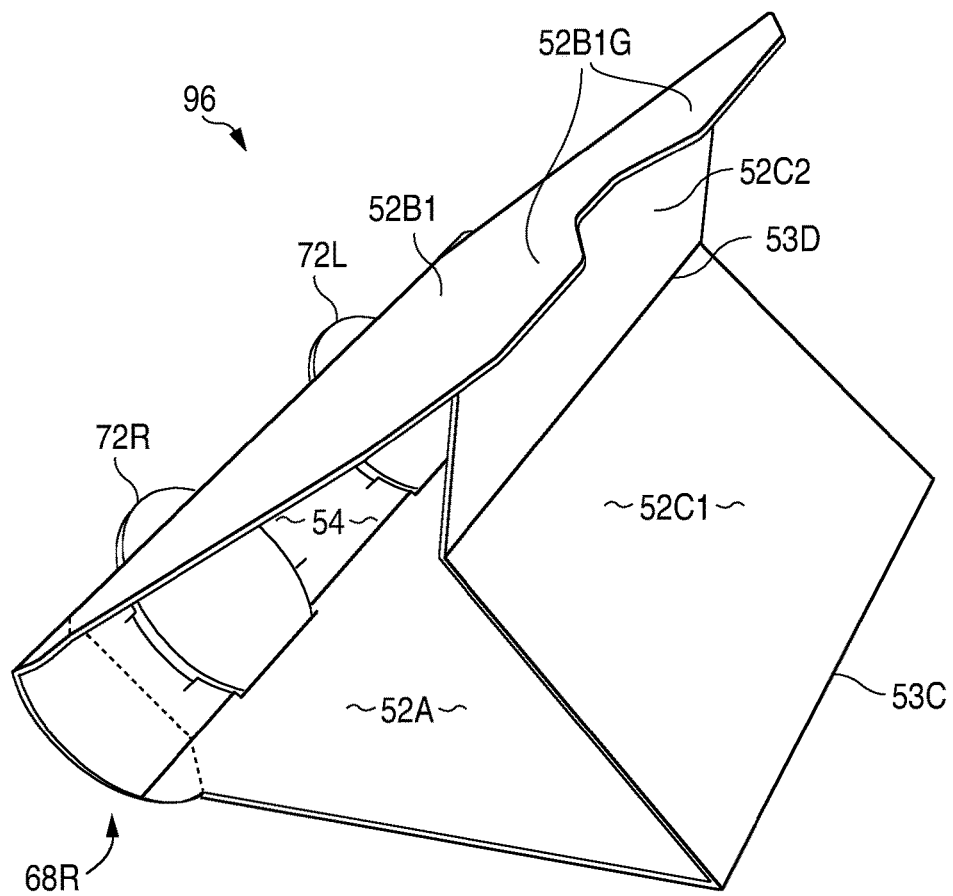
FIG. 18 is rear perspective view of the further embodiment viewing apparatus of FIGS. 17A/B in the process of being switched to the folded viewing state.
Figure 19:
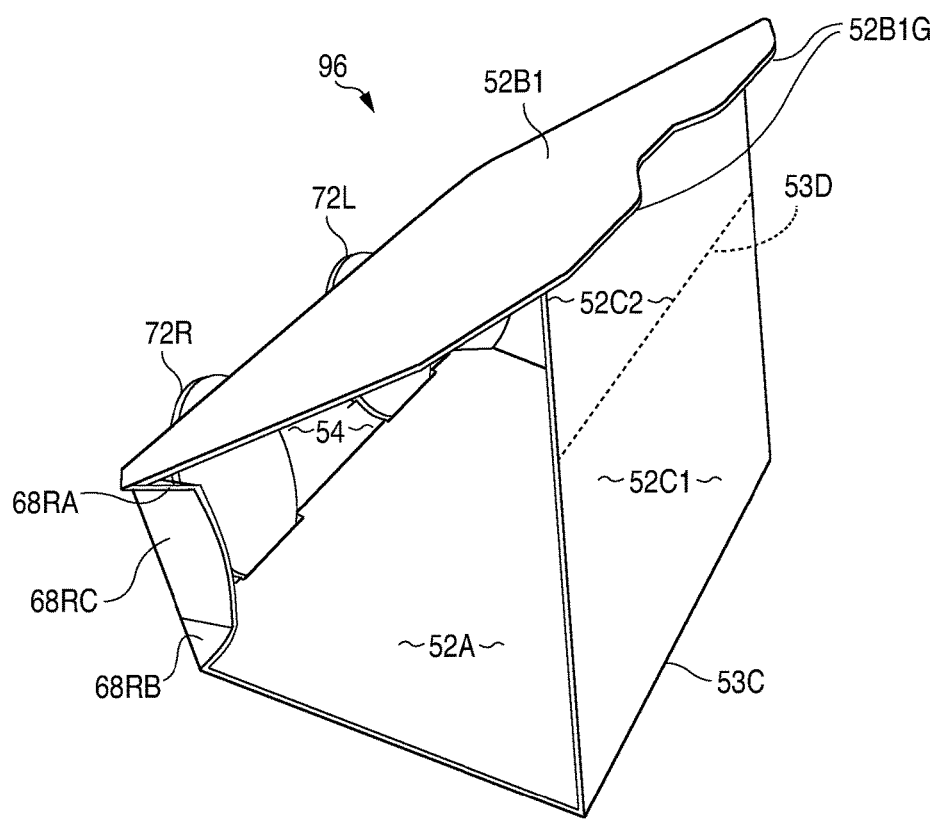
FIG. 19 is a rear perspective view of the viewing apparatus of FIG. 18 where the apparatus is completely switched to the folded viewing state.

A further embodiment of the subject viewing apparatus is depicted in FIGS. 17A, 17B, 18 and 19. This embodiment, generally designated by the numeral 96, is similar to the embodiment 50 of FIGS. 5 and 6 with various exceptions. First, the third sheet segment 52C of embodiment 50 has been replaced with fourth and fifth sheet segments 52C1 and 52C2 separated by a fourth fold line 53D. Further, the temporary connection between the second and third sheet segments 52B and 52C using connecting tab members 74L and 74R and respective connecting slots 76L and 76R in the earlier embodiment is replaced with a permanent adhesive connection. In this manner, the four sheet segments 52A, 52B1, 52C1, 52C2 and 54 form a continuous loop which so that the subject viewing apparatus is only capable of being switched between a folded storage state as depicted in FIGS. 17A and 17B and a folded operating state as depicted in FIG. 19 and not a planar state.

FIGS. 17A and 17B show the further embodiment 96 is the folded storage state, but slightly expanded for purposes of clarity whereas sheet segments 52A, 52C1, 52C2, 52B1 and 54 would normally be lying flat against one another in this state. The geometry of the segments is such that the viewer may be folded virtually flat for shipping in an envelope. FIG. 17A shows folded apparatus with the lenses installed and FIG. 17B shows the apparatus without the lenses installed. Preferably, the fold lines are implemented either by scoring or perforations (alone or in combination with scoring) as previously described in the earlier embodiment, with new fold lines 53D and 53E of embodiment 96 being implemented by scoring alone. The scoring of fold line 53D is preferably carried out on the outer or cosmetic side. The end of the fifth sheet segment 52C2 opposite fold 53D is permanently secured to sheet segment 52B1 by way of an adhesive. Fold line 53E is formed in sheet segment 52C2 adjacent the adhesive which secures segment 52C2 to sheet segment 52B1. The total linear length of the two sheet segments 52C1 and 52C2 between fold lines 53C and 53E can be the same as length W3 of the first embodiment of FIG. 6. In that case, the other corresponding dimensions of the present embodiment 96 and the previous embodiment 50 are about the same.

Embodiment 96 of the subject viewing apparatus is deployed by the end user from the folded storage state of FIGS. 17A and 17B by installing the lenses 72R and 72L if applicable and then unfolding the apparatus as depicted in FIG. 18. That operation includes the application of a small force against the interior surfaces of sheet segments 52C1 and 52C2 in the region of fold line 53D until the segments are disposed in the same plane as depicted in FIG. 19. Next, the two tab members 68R and 68L are deployed as also depicted in FIG. 19 (member 68L not visible). The end user can then install a SmartPhone in the viewing apparatus 96 by resting the phone on sheet segment 52A adjacent sheet segments 52C1 and 52C2 much in the same manner as depicted in FIG. 16A in connection with the previous embodiment.

Embodiment 96 is somewhat easier to deploy than the earlier embodiments since it is not necessary to secure the ends of sheet segments using, for example, tab members 74L/R and curved slots 76L/R. However, since sheet segment 52C2 is permanently attached to sheet segment 52B1 by an adhesive, it is not possible to switch embodiment 96 to a planar state as depicted in FIG. 5 for embodiment 50. However, if the planar state is to be an option, the previously-described adhesive connection can be replaced with the tab members 74L/R and curved slots 76L/R arrangement.

The various embodiments of the subject viewing apparatus can be manufactured and shipped at low cost. Thus, the subject viewing apparatus are particularly suitable for high volume promotional and other advertising applications. By way of example, the subject viewing apparatus can easily be provided to a large number of people attending a conference, a musical concert or the like. The outer or cosmetic side of the third sheet segment 52C as depicted in FIG. 16B can be readily viewed by bystanders in such venues and is thus is ideal for displaying promotional content. The outer surface of the first sheet segment 52A, as shown in FIG. 16A is less visible to bystanders and is thus suitable for displaying assembly/operating instructions for the subject viewing device.

Figure 20:
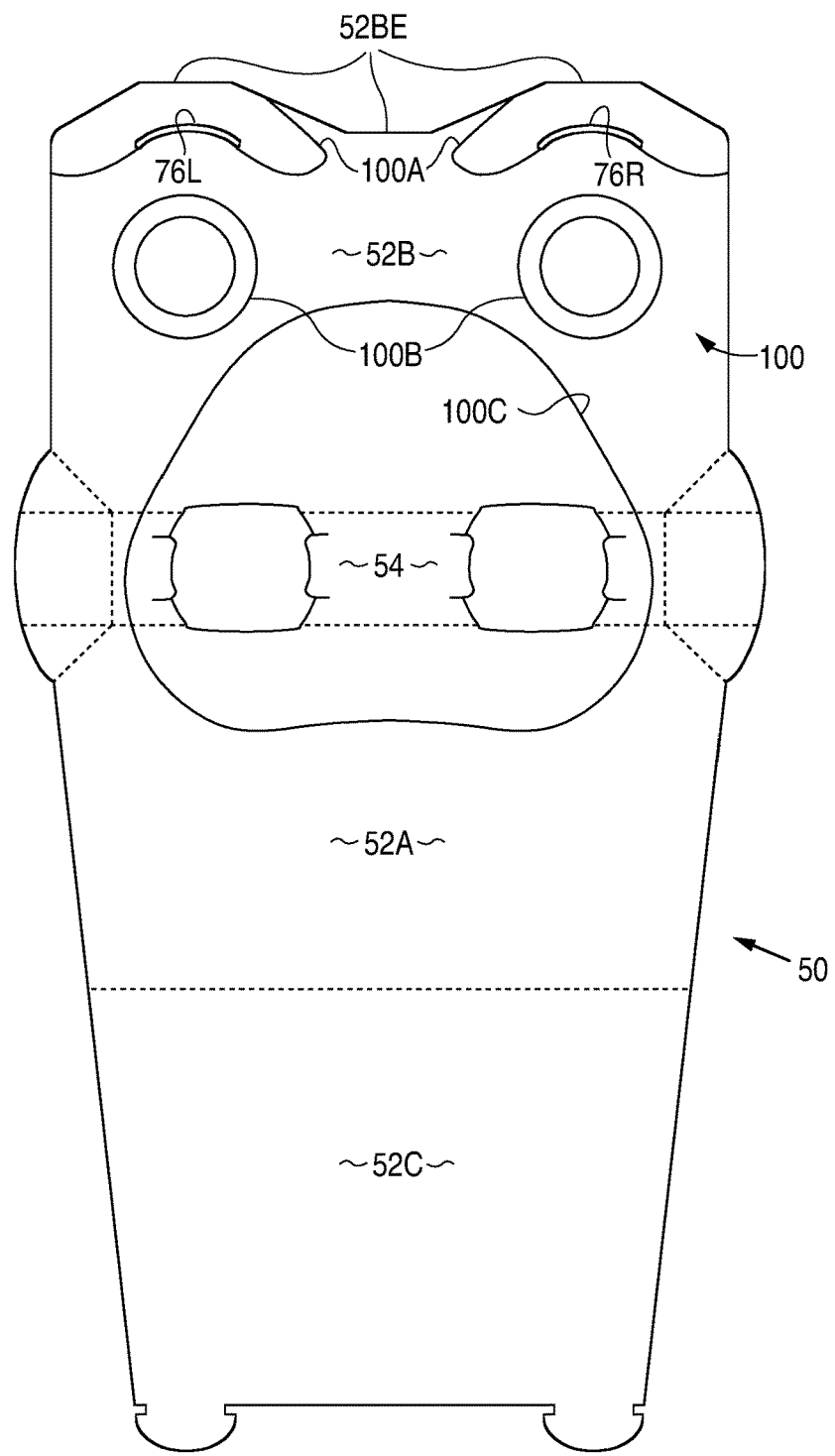
FIG. 20 is a plan view of first embodiment viewing apparatus of FIG. 5 further including graphic images disposed on the cosmetic side of the viewer which are coordinated with nonlinear edges of the apparatus to provide an overall appearance that is a composite of the graphic images and the edges.

The outer surface of the second sheet segment 52B as shown in FIG. 16A can also be used for advertising or other types of promotions. As can be seen in FIG. 5, for example, the outer edge 52BE of sheet segment 52B is nonlinear given, among other things, the spaced apart rounded elements near the curved connecting slots 76L and 76R. Such nonlinear edges of the second sheet segment 52B when coordinated with related graphics displayed on segment 52B can create an overall appearance that is a composite of the graphics and the nonlinear edges. In fact, any of the exposed outer edges of the second sheet segment 52B could be nonlinear edges that are combined with graphics for this purpose. This combination of nonlinear edges and graphics allows the creation of to a wide range of novel visual effects that are very useful in promotional activities. By way of example, FIG. 20 shows the viewing apparatus 50 of FIG. 5 with graphic images 100 added, primarily to the second sheet segment 52B, having an appearance of some kind of "creature". Those images include a pair of "eyebrows" 100A disposed on the second sheet segment, a pair of "eyes" 100B on that segment and a "nose" 100C spread over sheet segments 52A, 52B and 54. It can be seen that the "eyebrows" 100A, which are integral with slots 76L/R, are disposed generally to conform to a large part of the nonlinear edges 52BE of the second sheet segment, with the nonlinear shape of the edges contributing to the overall appearance of the "creature". It can be seen that the graphic images 100 and the nonlinear edges 52BE are coordinated with one another so as provide an overall appearance that is a composite of the graphic images and edges.

Figure 4:
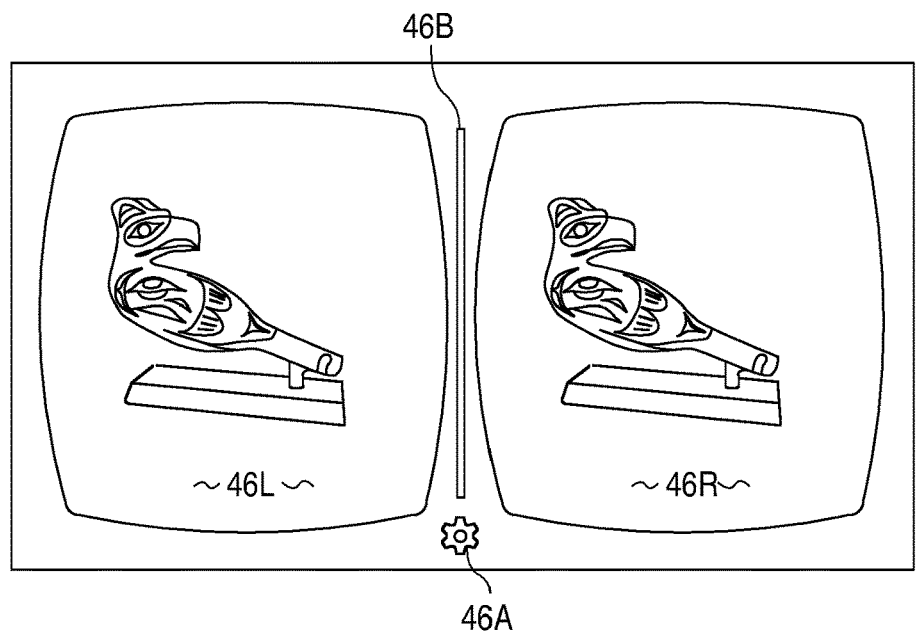
FIG. 4 is prior art SmartPhone screen shot showing an exemplary stereoscopic image to be viewed on the viewing apparatus of FIG. 1.

As shown in FIGS. 17A and 19, embodiment 96 can also be provided with extensions 52B1G having nonlinear edges along with associated graphics for the same purpose. In the event distribution of the viewing apparatus is to be carried out using mailing envelopes as depicted in FIGS. 13 and 15 for example, the overall size of the second sheet segment 52B and 52B1G must be appropriately sized. Note further that a fixed stereoscopic image pair 51L and 51R (FIG. 10B), such as depicted in FIG. 4 (but not produced by a SmartPhone), can be printed onto, or applied to, the inner side (non-cosmetic side) of sheet 52C (or sheet segments 52C1/52C2). The fixed stereographic image may, for example, be related to the graphic images displayed on exterior surfaces of the subject viewing apparatus. In this manner, in the absence of a SmartPhone, the user can view the printed image pair in simulated 3D.

Thus, various embodiments of a compact stereoscopic viewing apparatus have been disclosed. Although these embodiments have been described in some detail, it should be understood by those skilled in the art that various changes can be made without departing from the spirit and scope of the invention as set forth in the appended claims.

What is claimed is:

1. A stereoscopic viewing apparatus for use with a SmartPhone comprising:
   left and right optical lenses;
   a sheet divided by parallel first and second fold lines so as to define a lens mounting segment disposed intermediate first and second sheet segments;
   a left lens mounting structure formed in said lens mounting segment, said first sheet segment and said second sheet segment, with said lens mounting segment defining
      a left lens opening for receiving the left lens and
      a first pair of opposing edge contacts disposed at opposite sides of the left lens opening and spaced apart from one another a distance so as to contact opposite edges of the left lens when the left lens is mounted in the left lens mounting structure,
      a pair of lens support tabs disposed at opposite sides of the left lens opening and extending toward a center of the left lens opening and spaced apart from one another a distance so as to extend past the opposite edges of the left lens when the left lens is mounted in the left lens mounting structure;

wherein the first sheet segment and the lens mounting segment define a first cutout which extends from the first sheet segment, past the first fold line to the left lens opening; and wherein the second sheet segment and lens mounting segment define a second cutout which extends from the second sheet segment, past the second fold line to the left lens opening; and a right lens mounting structure formed in said lens mounting segment, said first sheet segment and said second sheet segment, with said lens mounting segment defining a right lens opening for receiving the right lens and a first pair of opposing edge contacts disposed at opposite sides of the right lens opening and spaced apart from one another a distance so as to contact opposite edges of the right lens when the right lens is mounted in the right lens mounting structure, a pair of lens support tabs disposed at opposite sides of the right lens opening and extending toward a center of the right lens opening and spaced apart from one another a distance so as to extend past the opposite edges of the right lens when the right lens is mounted in the right lens mounting structure;

wherein the first sheet segment and the lens mounting segment define a third cutout which extends from the first sheet segment, past the first fold line to the right lens opening; and wherein the second sheet segment and the lens mounting segment define a fourth cutout which extends from the second sheet segment, past the second fold line to the right lens opening.

2. The stereoscopic viewing apparatus of claim 1 wherein the sheet further includes a third sheet segment separated from the first sheet segment by a third fold line parallel to the first and second fold lines.

3. The stereoscopic viewing apparatus of claim 2 wherein the second sheet segment includes at least one nonlinear edge along with graphic images on a surface of the second sheet segment, with the at least one nonlinear edge and the graphic images being coordinated with one another so as to provide an overall appearance that is a composite of the graphic images and the nonlinear edges.

4. The stereoscopic viewing apparatus of claim 2 wherein the third sheet segment includes an inner surface which bears a stereographic image.

5. The stereoscopic viewing apparatus of claim 2 wherein the third sheet segment includes an end portion opposite the third fold line and the second sheet segment includes an end portion opposite the second fold line and wherein the viewing apparatus further includes means for manually securing and releasing the end portion of the third sheet segment to and from the end portion of the second sheet segment.

6. The stereoscopic viewing apparatus of claim 5 wherein the third sheet segment is generally parallel to the lens mounting segment when the means for manually securing operates to secure the end portions of the second and third sheet segments together.

7. The stereoscopic viewing apparatus of claim 5 wherein the means for manually securing includes a pair of curved slots defined by the end portion of one of the second and third sheet segments and a pair of flat connecting tabs disposed at the end portion of the other one of the second and third sheet segments, with the connecting tabs being configured to flex from a curved state when initially inserted in the respective curved slots and to then flex back to a flat state when further inserted in the respective curved slots thereby securing the end portions of the second and third sheet segments together.

8. The stereoscopic viewing apparatus of claim 6 wherein the apparatus is capable of being switched among a planar state, a folded storage state and a folded operating state and when in the folded operating state, the means for securing operates to secure the end portions of the second and third sheet segments together.

9. The stereoscopic viewing apparatus of claim 8 wherein the sheet further includes a left tab member disposed at a left end of the lens mounting segment and separated from the lens mounting segment by a left tab fold line which is orthogonal to the first and second fold lines and a right tab member disposed at a right end the lens mounting segment opposite the left end and separated from the lens mounting segment by a right tab fold line which is orthogonal to the first and second fold lines, with the left and right tab members being configured such that when the viewing apparatus is in the planar state the left and right tab members are in a same plane as the lens mounting segment and when the viewing apparatus is in the folded operating state at least a portion of each of the left and right tab members are disposed intermediate the first and second sheet segments and tend to bias the first and second sheet segments away from one another.

10. The stereoscopic viewing apparatus of claim 9 wherein the left lens mounting structure further includes a second pair of opposing edge contacts disposed at opposite sides of the left lens opening and spaced apart from one another a distance so to contact opposite edges of the left lens when the left lens is mounted in the left lens mounting structure and the right lens mounting structure further includes a second pair of opposing edge contacts disposed at opposite sides of the right lens opening and spaced apart from one another a distance so to contact opposite edges of the right lens when the right lens is mounted in the right lens mounting structure.

11. The stereoscopic viewing apparatus of claim 9 wherein, when the viewing apparatus is in the planar state, the first and second fold lines extend through the left and right tab members dividing each tab member into a central tab region intermediate the first and second fold lines and two outer tab regions.

12. The stereoscopic viewing apparatus of claim 11 wherein, when the viewing apparatus is in the folded operating state with the end portions of the second and third sheet segments being secured together by the means for securing, the central tab regions of the left and right tab members are both folded around the respective left and right tab fold lines to a tab folded state, with dimensions of the respective center and outer tab regions of the left and right tab members being selected to provide an over-center structure which operates to maintain the left and right tab members in the tab folded state.

13. The stereoscopic viewing apparatus of claim 11 wherein both score lines and perforations operate to form the first, second and third fold lines.

14. The stereoscopic viewing apparatus of claim 8 further includes a lens caddy which supports the left and right optical lenses independent of the lens mounting segment when the subject viewing apparatus is in the folded storage state.

15. The stereoscopic viewing apparatus of claim 2 further including a fourth sheet segment separated from the third sheet segment by a fourth fold line which is parallel to the first, second and third fold lines and with the lens mounting segment together with the first, second, third and fourth sheet segments forming a continuous loop.

16. The stereoscopic viewing apparatus of claim 15 wherein the fourth and second sheet segments are connected together at a fifth fold line by way of an adhesive, with the fifth fold line being parallel to the first, second, third and fourth fold lines.

17. The stereoscopic viewing apparatus of claim 15 wherein the apparatus is capable of being switched between a folded storage state and a folded operating state and wherein in the folded operating state the third and fourth sheet segments are substantially disposed in a common plane which is generally parallel to the lens mounting segment.

18. The stereoscopic viewing apparatus of claim 17 wherein the continuous loop of lens mounting and sheet segments each have an exterior and an interior surface and when the apparatus is in the folded storage state, the third and fourth sheet segments are folded around the fourth fold line with the exterior surfaces of the third and fourth sheet segments facing one another.

19. The stereoscopic viewing apparatus of claim 18 wherein the apparatus is capable of being switched between a folded storage state and a folded operating state and wherein the sheet further includes a left tab member extending away from a left end of the lens mounting segment and a right tab member extending away from a right end of the lens mounting segment and wherein the left and right tab members are substantially coplanar with the lens mounting segment when the viewing apparatus is in the folded storage state and wherein the left and right tab members are both folded to a position at least partially intermediate the first and second sheet segments when the viewing apparatus is in the folded operating state.

20. The stereoscopic viewing apparatus of claim 15 wherein the second sheet segment includes at least one nonlinear edge along with graphic images on a surface of the second sheet segment, with the at least one nonlinear edge and the graphic images being coordinated with one another so as to provide an overall appearance that is a composite of the graphic images and the nonlinear edges.

21. The stereoscopic viewing apparatus of claim 15 wherein the apparatus is capable of being switched between a folded storage state and a folded operating state and wherein the segments comprising the continuous loop of the sheet segments and the lens mounting segment each include an interior and exterior surface and wherein the interior surfaces of the third and fourth sheet segments bear a fixed stereographic image when the viewing apparatus is switched to the folded operating state.

22. A stereoscopic viewing apparatus for use with a SmartPhone comprising:
left and right optical lenses;
a sheet divided by parallel first and second fold lines so as to define a lens mounting segment disposed intermediate first and second sheet segments, with the first and second fold lines being spaced apart a distance smaller than an outside diameter of the left and right optical lenses;
a left lens mounting structure formed in said lens mounting segment, with said lens mounting segment defining
a left lens opening for receiving the left lens and
a pair of opposing edge contacts disposed at opposite sides of the left lens opening and spaced apart from one another a distance so as to contact opposite edges of the left lens when the left lens is mounted in the left lens mounting structure,
a pair of lens support tabs disposed at opposite sides of the left lens opening and extending toward a center of the left lens opening and spaced apart from one another a distance so as to extend past the opposite edges of the left lens when the left lens is mounted in the left lens mounting structure; and
a right lens mounting structure formed in said lens mounting segment, with said lens mounting segment defining
a right lens opening for receiving the right lens and
a pair of opposing edge contacts disposed at opposite sides of the right lens opening and spaced apart from one another a distance so as to contact opposite edges of the right lens when the right lens is mounted in the right lens mounting structure,
a pair of lens support tabs disposed at opposite sides of the right lens opening and extending toward a center of the right lens opening and spaced apart from one another a distance so as to extend past the opposite edges of the right lens when the right lens is mounted in the right lens mounting structure and wherein the viewing apparatus is switchable among plural states including a planar state where the first and second sheet segments are substantially coplanar and a folded operating state where the first and second sheet segments are folded about the respective first and second fold lines with respect to the lens mounting segment.

23. The stereoscopic viewing apparatus of claim 22 wherein the second sheet segment includes at least one nonlinear edge along with graphic images on a surface of the second sheet segment, with the at least one nonlinear edge and the graphic images being coordinated with one another so as to provide an overall appearance that is a composite of the graphic images and the nonlinear edges.

24. The stereoscopic viewing apparatus of claim 22 wherein the first sheet segment and the lens mounting segment of the left lens mounting structure define a first cutout which extends from the first sheet segment, past the first fold line to the left lens opening, wherein the second sheet segment and the lens mounting segment of the left lens mounting structure define a second cutout which extends from the second sheet segment, past the second fold line to the left lens opening; wherein the first sheet segment and the lens mounting segment of the right lens mounting structure define a third cutout which extends from the first sheet segment, past the first fold line to the right lens opening; and wherein the second sheet segment and the lens mounting segment of the right lens mounting structure define a fourth cutout which extends from the second sheet segment, past the second fold line to the right lens opening.

25. The stereoscopic viewing apparatus of claim 24 wherein the plural states further include a folded storage state and wherein the sheet further includes a left tab member disposed at a left end of the lens mounting segment and separated from the lens mounting segment by a left tab fold line which is orthogonal to the first and second fold lines and a right tab member disposed at a right end of the lens mounting segment opposite the left end and separated from the lens mounting segment by a right tab fold line which is orthogonal to the first and second fold lines, with the left and right tab members being configured such that when the viewing apparatus is in the planar state the left and right tab members are in a same plane as the lens mounting segment and when the viewing apparatus in the folded operating state at least a portion of each of the tab members are disposed intermediate the first and second sheet segments and tend to bias the first and second sheet segments away from one another.

26. The stereoscopic viewing apparatus of claim 22 wherein the first and second fold lines are implemented using both score lines and perforations so as to facilitate switching into the folded operating state.

27. A stereoscopic viewing apparatus for use with a SmartPhone comprising:
   left and right optical lenses;
   a sheet divided by parallel first and second fold lines so as to define a lens mounting segment disposed intermediate first and second sheet segments, with spacing between the first and second fold lines being smaller than an outer diameter of the left and right optical lenses;
   a left lens mounting structure formed in said lens mounting segment, said first sheet segment and said second sheet segment, with said lens mounting segment defining
      a left lens opening for receiving the left lens and
      a pair of opposing edge contacts disposed at opposite sides of the left lens opening and spaced apart from one another a distance so as to contact opposite edges of the left lens when the left lens is mounted in the left lens mounting structure,
      a pair of lens support tabs disposed at opposite sides of the left lens opening and extending toward a center of the left lens opening and spaced apart from one another a distance so as to extend past the opposite edges of the left lens when the left lens is mounted in the left lens mounting structure;
   wherein the first sheet and the lens mounting segments define a first cutout which extends from the first sheet segment, past the first fold line to the left lens opening; and
   wherein the second sheet and lens mounting segments define a second cutout which extends from the second sheet segment, past the second fold line to the left lens opening; and
   a right lens mounting structure formed in said lens mounting segment, said first sheet segment and said second sheet segment, with said lens mounting segment defining
      a right lens opening for receiving the right lens and
      a pair of opposing edge contacts disposed at opposite sides of the right lens opening and spaced apart from one another a distance so as to contact opposite edges of the right lens when the right lens is mounted in the right lens mounting structure,
      a pair of lens support tabs disposed at opposite sides of the right lens opening and extending toward a center of the right lens opening and spaced apart from one another a distance so as to extend past the opposite edges of the right lens when the right lens is mounted in the right lens mounting structure;
   wherein the first sheet and lens mounting segments define a third cutout which extends from the first sheet segment, past the first fold line to the right lens opening; and
   wherein the second sheet and lens mounting segments define a fourth cutout which extends from the second sheet segment, past the second fold line to the right lens opening.

28. The stereoscopic viewing apparatus of claim 27 wherein the second sheet segment includes at least one nonlinear edge along with graphic images on a surface of the second sheet segment, with the at least one nonlinear edge and the graphic images being coordinated with one another so as to provide an overall appearance that is a composite of the graphic images and the nonlinear edge.

* * * * *